(12) United States Patent
Liff et al.

(10) Patent No.: US 10,845,552 B2
(45) Date of Patent: Nov. 24, 2020

(54) CORELESS PACKAGE ARCHITECTURE FOR MULTI-CHIP OPTO-ELECTRONICS

(71) Applicant: Intel Corporation, Santa Clara, CA (US)

(72) Inventors: Shawna M. Liff, Scottsdale, AZ (US); Henning Braunisch, Phoenix, AZ (US); Timothy A. Gosselin, Phoenix, AZ (US); Prasanna Raghavan, Chandler, AZ (US); Yikang Deng, Chandler, AZ (US); Zhiguo Qian, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,216

(22) PCT Filed: Sep. 12, 2017

(86) PCT No.: PCT/US2017/051168
§ 371 (c)(1),
(2) Date: Jun. 24, 2019

(87) PCT Pub. No.: WO2018/200022
PCT Pub. Date: Nov. 1, 2018

(65) Prior Publication Data
US 2019/0317285 A1    Oct. 17, 2019

Related U.S. Application Data

(60) Provisional application No. 62/492,024, filed on Apr. 28, 2017.

(51) Int. Cl.
*G02B 6/42* (2006.01)
*F21V 8/00* (2006.01)
*G02B 6/293* (2006.01)

(52) U.S. Cl.
CPC ......... *G02B 6/4269* (2013.01); *G02B 6/0005* (2013.01); *G02B 6/2938* (2013.01); *G02B 6/4274* (2013.01)

(58) Field of Classification Search
CPC .. G02B 6/4269; G02B 6/0005; G02B 6/2938; G02B 6/4274
(Continued)

(56) References Cited

U.S. PATENT DOCUMENTS

| 6,274,391 B1 | 8/2001 | Wachtler et al. |
| 2004/0240773 A1* | 12/2004 | Kobinata ............. G02B 6/4253 385/14 |

(Continued)

FOREIGN PATENT DOCUMENTS

WO    2014139338 A1    9/2014

OTHER PUBLICATIONS

International Search Report and Written Opinion, dated Jan. 16, 2018, issued in related International Application No. PCT/US2017/051168, 15 pages.

*Primary Examiner* — Jerry M Blevins
(74) *Attorney, Agent, or Firm* — Schwabe, Williamson & Wyatt, P.C.

(57) ABSTRACT

An optoelectronic apparatus is presented. In embodiments, the apparatus may include a package including a substrate with a first side and a second side opposite the first side, wherein the first side comprises a ball grid array (BGA) field. The apparatus may further include one or more integrated circuits (ICs) disposed on the first side of the substrate, inside the BGA field, that thermally interface with a printed circuit board (PCB), to which the package is to be coupled, one or more optical ICs coupled to the second side and communicatively coupled with the one or more ICs via interconnects provided in the substrate, wherein at least one (Continued)

of the optical ICs is at least partially covered by an integrated heat spreader (IHS), to provide dissipation of heat produced by the at least one optical IC.

25 Claims, 22 Drawing Sheets

(58) Field of Classification Search
USPC .......................................................... 385/14
See application file for complete search history.

(56) References Cited

U.S. PATENT DOCUMENTS

| | | | |
|---|---|---|---|
| 2006/0285806 A1* | 12/2006 | Ahrens | G02B 6/4246 |
| | | | 385/92 |
| 2007/0289127 A1 | 12/2007 | Hurwitz et al. | |
| 2008/0285910 A1* | 11/2008 | Yamada | H05K 3/4691 |
| | | | 385/14 |
| 2009/0238233 A1 | 9/2009 | Bchir et al. | |
| 2011/0044367 A1* | 2/2011 | Budd | G02B 6/4257 |
| | | | 372/50.21 |
| 2012/0087678 A1* | 4/2012 | Earnshaw | H04B 10/506 |
| | | | 398/202 |
| 2015/0016772 A1* | 1/2015 | Arao | G02B 6/4284 |
| | | | 385/14 |
| 2015/0168659 A1* | 6/2015 | Lai | G02B 6/421 |
| | | | 385/14 |
| 2015/0241631 A1 | 8/2015 | Fish et al. | |
| 2017/0186665 A1* | 6/2017 | Choudhury | H01L 24/27 |
| 2019/0324223 A1* | 10/2019 | Yim | G02B 6/12004 |

* cited by examiner

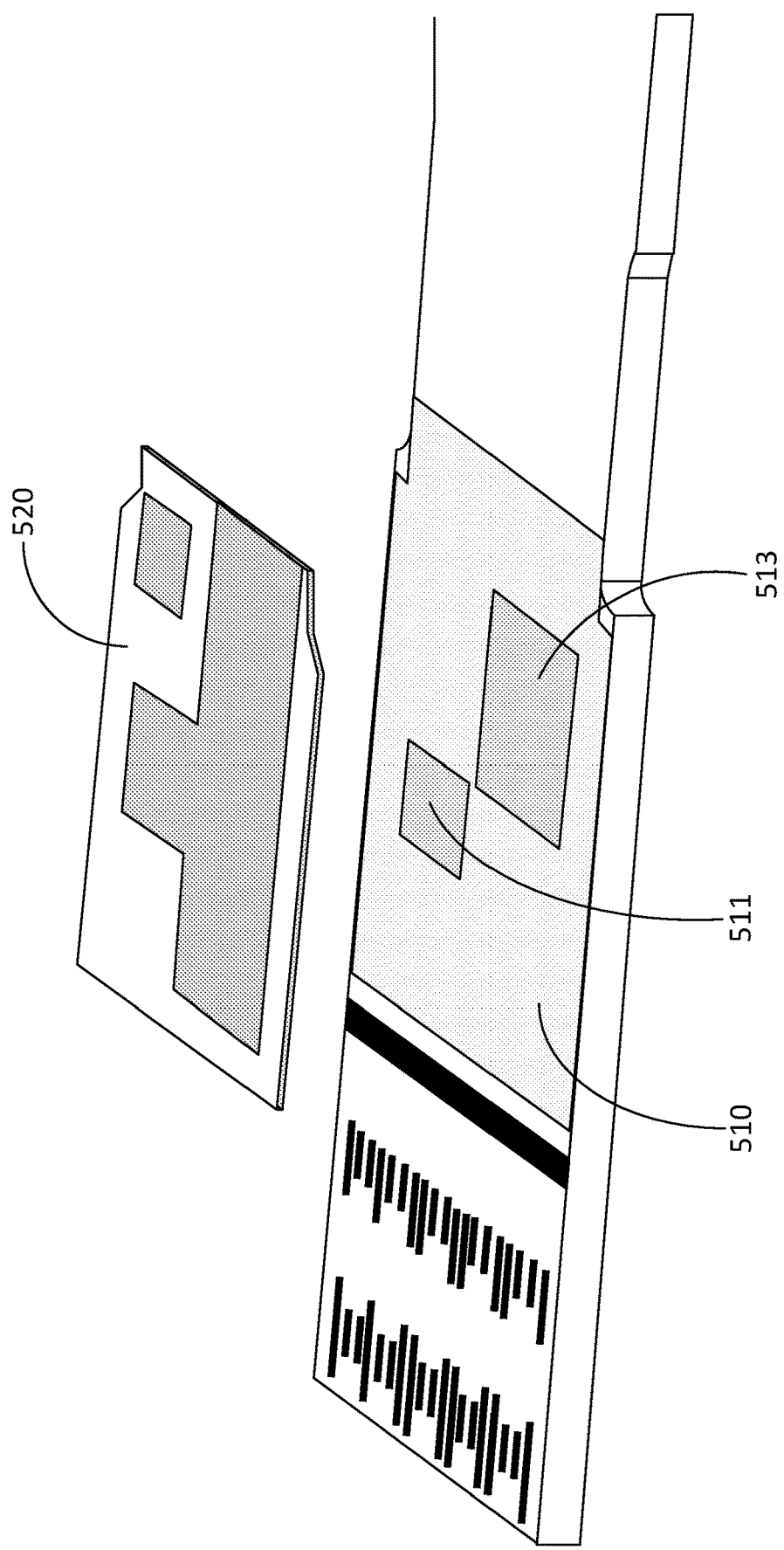

CORELESS PACKAGE ARCHITECTURE FOR MULTI-CHIP OPTO-ELECTRONICS

CROSS REFERENCE TO RELATED APPLICATIONS

The present application is a national phase entry under 35 U.S.C. § 371 of International Application No. PCT/US2017/051168, filed Sep. 12, 2017, entitled "CORELESS PACKAGE ARCHITECTURE FOR MULTI-CHIP OPTO-ELECTRONICS", which designates the United States of America, which claims priority to a U.S. Provisional Patent Application No. 62/492,024, entitled "CORELESS PACKAGE ARCHITECTURE FOR MULTI-CHIP OPTO-ELECTRONICS," filed Apr. 28, 2017, the entire disclosures of which are hereby incorporated by reference.

FIELD

Various embodiments generally relate to the field of opto-electronic modules, and in particular to a coreless package architecture for multi-chip optoelectronics.

BACKGROUND

Opto-electronic packaging is of increasing interest and importance, especially as regards photonics. This may be due to the continually increasing quantities of data being produced and leveraged, and the need for the movement of large packets of data across longer distances such as in data centers.

Entities that are engaged in significant, and often worldwide, e-commerce, or entities providing social media platforms, may have extremely flat data centers. As a result, they may rely on single mode fiber silicon photonics to enable fewer hops between racks. It is noted that optical encoding of data enables faster transfer of larger packets, with lower power penalty, over longer distances than over copper cables or radio frequency (RF).

Opto-electronic packaging has yet to be fully leveraged.

BRIEF DESCRIPTION OF THE DRAWINGS

Embodiments will be readily understood by the following detailed description in conjunction with the accompanying drawings. To facilitate this description, like reference numerals designate like structural elements. Alternatively, if a structure is presented in several figures the last two digits will be maintained across those multiple figures, and the first digit will refer to the figure number in which it respectively appears. Embodiments are illustrated by way of example and not by way of limitation in the figures of the accompanying drawings.

FIG. 5C illustrates the example package of FIG. 5B being mated to an example PCB according to various embodiments.

DETAILED DESCRIPTION

Figure 1:
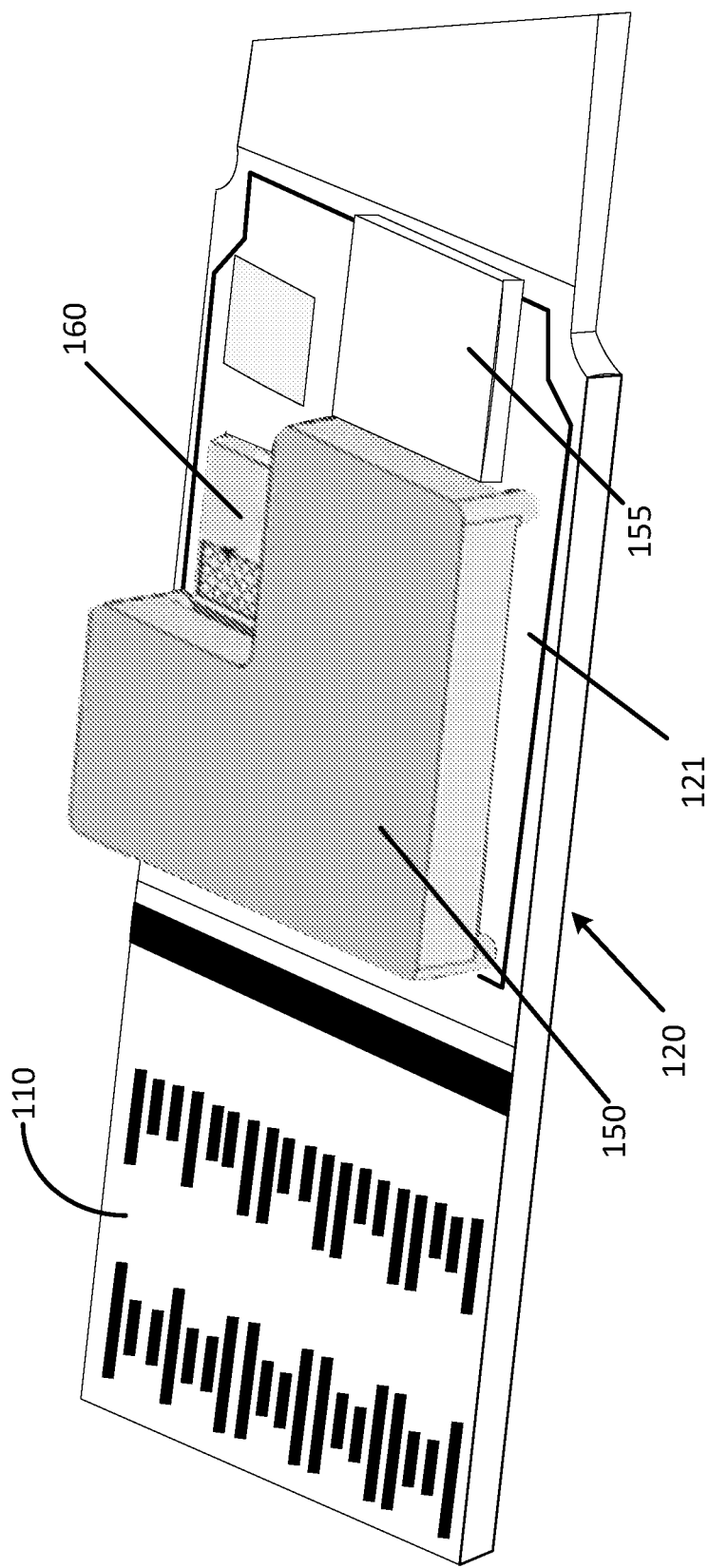
FIG. 1 illustrates a top isometric view of a coreless package, surface-mounted to a PCB with an integrated heat spreader ("IHS") covering a portion of an optical transmitter in accordance with various embodiments.

In embodiments, an apparatus may include a package including a coreless substrate with a first side and a second side opposite the first side, wherein the first side comprises a ball grid array (BGA) field. The apparatus may further include one or more integrated circuits (ICs) disposed on the first side of the coreless substrate, inside the BGA field, that thermally interface with a printed circuit board (PCB), to which the package is to be coupled, one or more optical ICs coupled to the second side and communicatively coupled with the one or more ICs via interconnects provided in the coreless substrate, wherein at least one of the optical ICs is at least partially covered by an integrated heat spreader (IHS), to provide dissipation of heat produced by the at least one optical IC.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

It is noted that in order to meet the fast data speeds now desired, it may be advantageous to provide optical modules that may plug into the back of a rack and leverage single mode optical fiber coupling, following standards such as Quad Small Form Factor Pluggable-Double Density ("QSFP-DD") or small form-factor pluggable (SFP).

In embodiments, a double-sided, organic coreless package architecture for multi-chip optoelectronics may be provided. A coreless package architecture may provide several advantages. These may include cost, thick copper for power delivery, the ability to optimize shielding and inductance/capacitance for high speed Input/Output (I/O), the ability to optimize thermal conductivity pathways with copper package density, and the leveraging of integrated heat sinks to manage thermals.

In embodiments, an organic coreless package may include electrical ICs within a Ball Grid Array ("BGA") field provided on a first surface of a substrate. The electrical ICs may thermally interface to interconnects on a printed circuit board to which the package may be thermally coupled. In embodiments, the electrical ICs may include an optical transmitter driver and transimpedance amplifier circuit, and may communicate at high frequencies such as, for example, 10 to 200 Gigahertz (GHz) through the substrate to a discrete optical transmitter and receiver, respectively, provided on a second (or upper) side of the substrate. For example, in embodiments, one or more of the electrical ICs may communicate at a rate greater than, or equal to, 56 Gigabytes per second (Gbps) through the substrate to one or more optical ICs on the upper side of the substrate. In embodiments, an optical transmitter and receiver flip chip may be provided on the second surface of the organic coreless substrate, and may interface with fiber optics with the active side facing the substrate. Alternatively, in other embodiments, the active side may face upwards and may interconnect using a through-silicon via (TSV). In embodiments, an integrated heat spreader (IHS) may extend across a majority of the optical transmitter and may be coupled to the optical transmitter via a compliant thermal interface material. In embodiments, this material may mitigate mechanical stresses applied through handling during test and active optical alignment, while also offering a thermal pathway to spread heat generated on the transmitter and thus keep the lasers operating at an acceptable (or cooler) temperature.

FIG. 1 illustrates an example optoelectronic apparatus 120 according to some embodiments. FIG. 1 presents a top isometric view of an example coreless package 120 with an IHS 150 covering a portion of an optical transmitter 155 in accordance with various embodiments. Continuing with reference to FIG. 1, there is also an optical receiver 160 provided on the upper surface of coreless package 120. Coreless package 120 may comprise substrate 121 that is surface mounted to the printed circuit board 110. It is noted that in this disclosure the apparatus or package as a whole (including substrate, optoelectronic ICs and electronic ICs) may often be referred to with an index number whose lowest two digits are "20" (e.g., 120, 220, etc.), and the substrate specifically may often be referred to with an index number whose lowest two digits are "21" (e.g., 121, 221, 321, etc.).

In embodiments, the example package may be mounted on printed circuit board (PCB) 110. In embodiments, optical transmitter 155 and receiver 160 may interface with fiber optics, and may have their active sides facing substrate 121. IHS 150 may extend across a majority of the optical transmitter and, in embodiments, may be coupled to the optical transceiver via a compliant thermal interface material (TIM). It is noted that IHS should not extend fully over optical transmitter 155 so as to leave room for an optical coupling apparatus to be attached to optical transmitter 155.

In embodiments, by leveraging a traditional flip-chip packaging architecture, time to market timelines and yield may be improved when compared to conventional multi-chip fan-out approaches. Moreover, it is noted that flip-chip coreless packages, especially prepreg coreless packages, may be relatively inexpensive when compared to silicon or glass interposers, or ceramic packages, for example.

Figure 2:
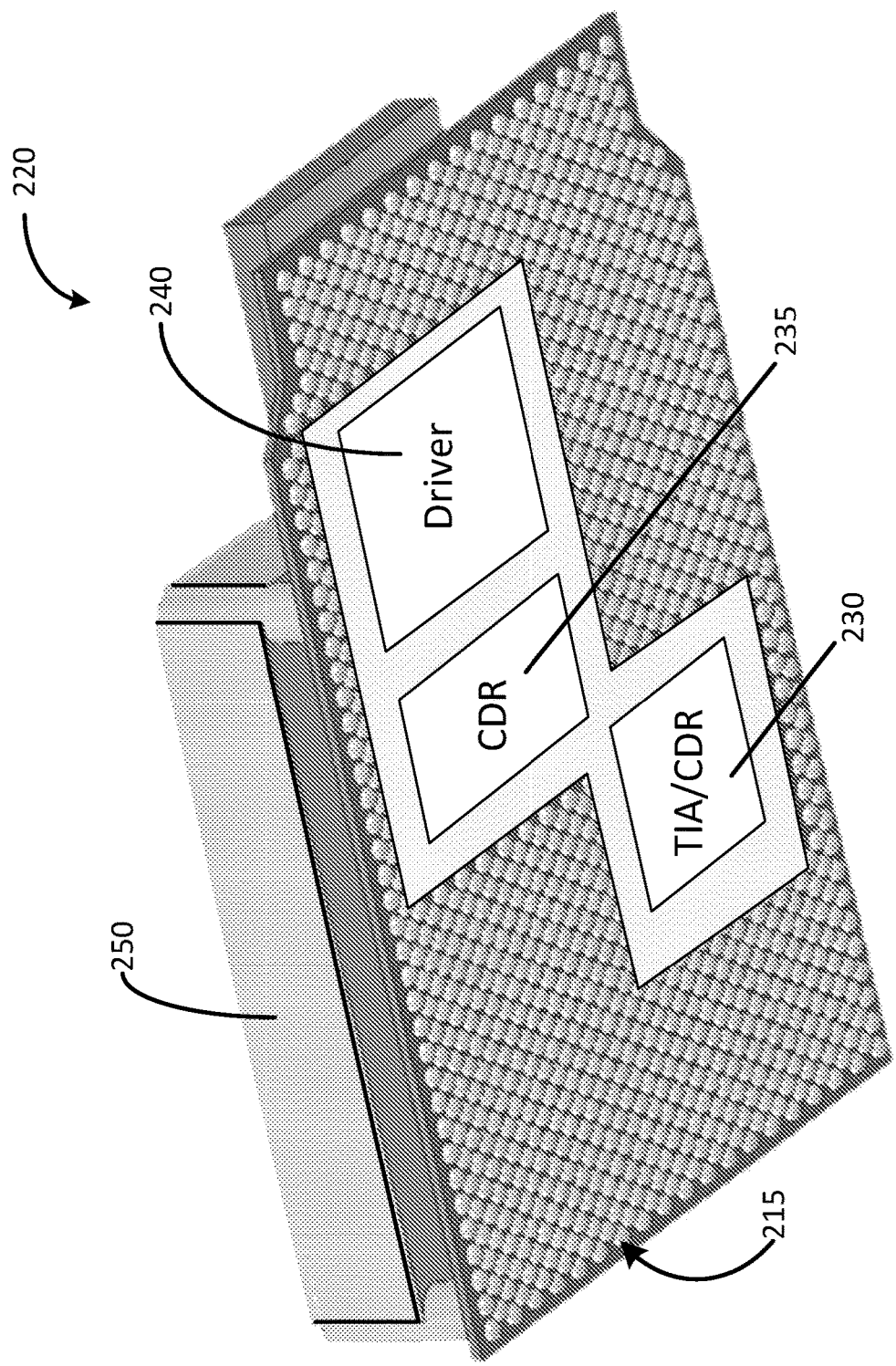
FIG. 2 illustrates a bottom isometric view of a package with three electrical integrated circuits (ICs) in a Ball Grid Array (BGA) field provided on an underside of the package that thermally interface to a thermal pathway in an example printed circuit board (PCB) to which the package may be coupled, in accordance with various embodiments.

FIG. 2 illustrates the underside of the example package of FIG. 1. FIG. 2 thus shows a bottom isometric view of example package 220 with three example electrical ICs: transimpedance amplifier/clock and data recovery (TIA/CDR) 230 (this chip couples to optical receiver 160 of FIG. 1), clock and data recovery (CDR) 235, and optical transmitter driver 240 (these two latter chips couple to optical transmitter 155 of FIG. 1). The three example ICs are provided in a Ball Grid Array (BGA) field 215. The three ICs may each thermally interface to a thermal pathway in a PCB, such as PCB 110 shown in FIG. 1, in accordance with various embodiments. It will be understood that three ICs are shown in FIG. 2 are for purposes of explanation and are not limiting this disclosure. In general, any number of ICs may be disposed in BGA field 215, depending on particular technological needs. A side portion of IHS 250 (which is attached to the top side of package 220) is also shown in FIG. 2. The visible side portion is the side of IHS 250 that covers the bottom edge of optical transmitter 155 shown in FIG. 1.

Figure 3:
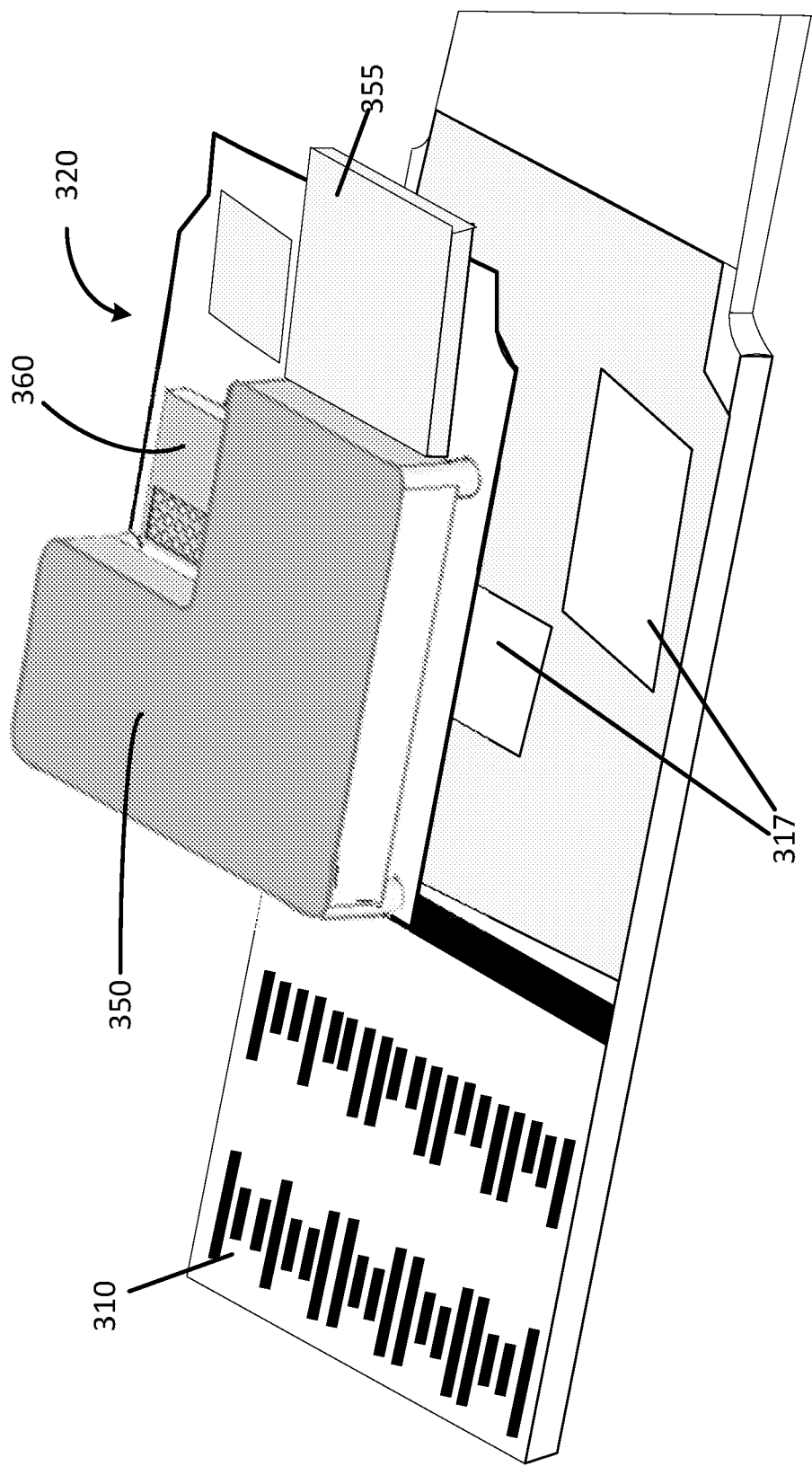
FIG. 3 illustrates an exploded isometric view of the example package of FIGS. 1-2, showing the location of thermal interfaces in an example PCB which the electrical ICs may contact via a thermal interface material, in accordance with various embodiments.

Continuing with reference to FIG. 3, an exploded isometric top view of example package 320 is shown positioned above PCB 310 to illustrate the locations 317 of interconnects, such as copper slugs or coins, or thermal via arrays connected to copper plane (not shown), on the upper surface of PCB 310. It is these interconnects, at locations 317, to which the example electrical ICs 230, 235 and 240 shown in FIG. 2, and provided on the underside of package 320 (and therefore not seen in FIG. 3), may contact via a TIM. On the upper side of package 320 are also visible optical RX 360, and IHS 350, which partially covers optical transmitter 355.

In embodiments, a double-sided coreless package architecture, as shown in FIGS. 1-3, may offer various advantages. For example, a double-sided coreless package architecture may utilize high volume manufacturing (HVM), low cost pre-preg coreless or dielectric build-up films, coreless packaging utilizing a lithographically defined via (LIV) or a high-density packaging interconnect (HDP) approach. Moreover, in embodiments, thick copper 15-18 um may be leveraged for power delivery and fine routing, as well as small capture pads and vias to both minimize capacitive losses as well as optimize inductance between the chips on either side of the package (i.e., electrical ICs on the underside, and optical ICs on the upper side) to provide excellent signal integrity up to, and likely beyond, 56 Gbps. In embodiments, at least one of the electrical ICs may communicate at frequencies between 10 and 200 Gigahertz (GHz) through the substrate to an optical transceiver provided on an upper surface of the substrate.

In embodiments, electrical ICs provided on the underside of the package may thermally dissipate 2-4 times the power of that dissipated on the upper side (for example, ~8 Watts (W) vs. 2.5 W). Thus, with a TIM provided between the electrical ICs and a board-level thermal solution on PCB 310, such as thermal vias, copper slugs/coins, etc., heat may be extracted away from the more thermally sensitive optical transmitter (355 in FIG. 3) and minimize the operating junction temperature (Tj) of the electrical ICs for improved system performance.

Figure 4:
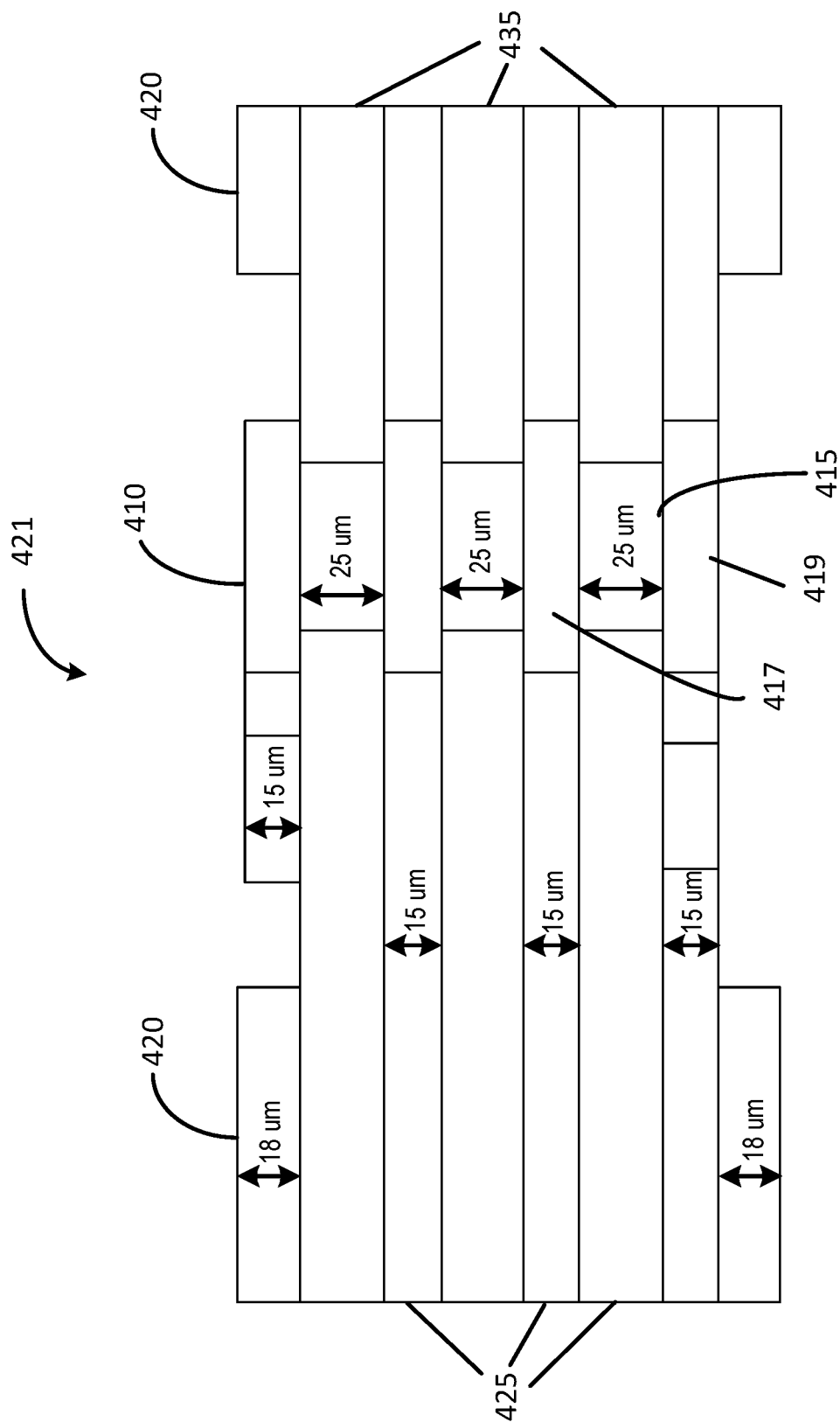
FIG. 4 illustrates a cross-section of an example prepreg coreless package according to various embodiments.

In embodiments, a package may comprise a prepreg coreless substrate with a stack-up. FIG. 4 illustrates a cross section of an example prepreg coreless substrate 421. In embodiments, substrate 121 of FIG. 1 may comprise substrate 421 of FIG. 4. In embodiments, either the base layer or the surface layer of substrate 421 may have a 10 micrometer (um) line width and a 10 um space length with embedded trace routing; all other layers may have 20 um/20 um line/space (L/S) dimensions. It is noted that L/S dimensions indicate how tightly traces may be spaced, and at what line width. In embodiments, substrate 421 may have protruding trace features on the alternate exposed side, using standard Flip Chip-Chip Scale Packages (FC-CSP) substrate technology, and a 25 um dielectric 435 with 50 um vias 415 and 90 um pads 410, 417 and 419.

As may be seen, there are two example stacks shown in FIG. 4. Each is shown with example, but understood not limiting, dimensions. The stack at 420 has an 18 um top solder resist layer, under which are three layers with a 25 um dielectric layer 435 above a 15 um copper layer 425, and then under those three layers is shown another 18 um base solder resist layer. The stack at 420 shows an example area with no copper (which, it is noted, seldom happens, being a void region through the entire stack).

The other stack is the via-pad stack at 410. Via-pad stack 410 has a 15 um top layer, under which, again, are three layers, each having a 25 um thick via layer 415 above a 15 um copper pad layer 417. These layers, however, are obviously of different materials than the structure at 420. Also, no base under the last layer 419 indicates that in embodiments, the copper may be embedded in the prepreg layer during build-up. It is noted that 410 is a protruded copper pad for the via, with the cross section of a trace extending to the left of the pad to which a die may adjoin. 419 is on the opposite side, as shown, but has equivalent features, and is embedded in the prepreg. What is shown is a 90 um diameter pad on a 50 um via with a trace extending to a small diameter pad to which the die on the opposite side may adjoin. These comprise electrical interconnects through the coreless package, connecting the electrical ICs below to their optical counterparts above. Thus, the stack at 410 illustrates an interconnected via stack that runs through the stack and interconnects to the bumps of a die at adjacent locations, connected by electrical copper traces.

Figure 5A:
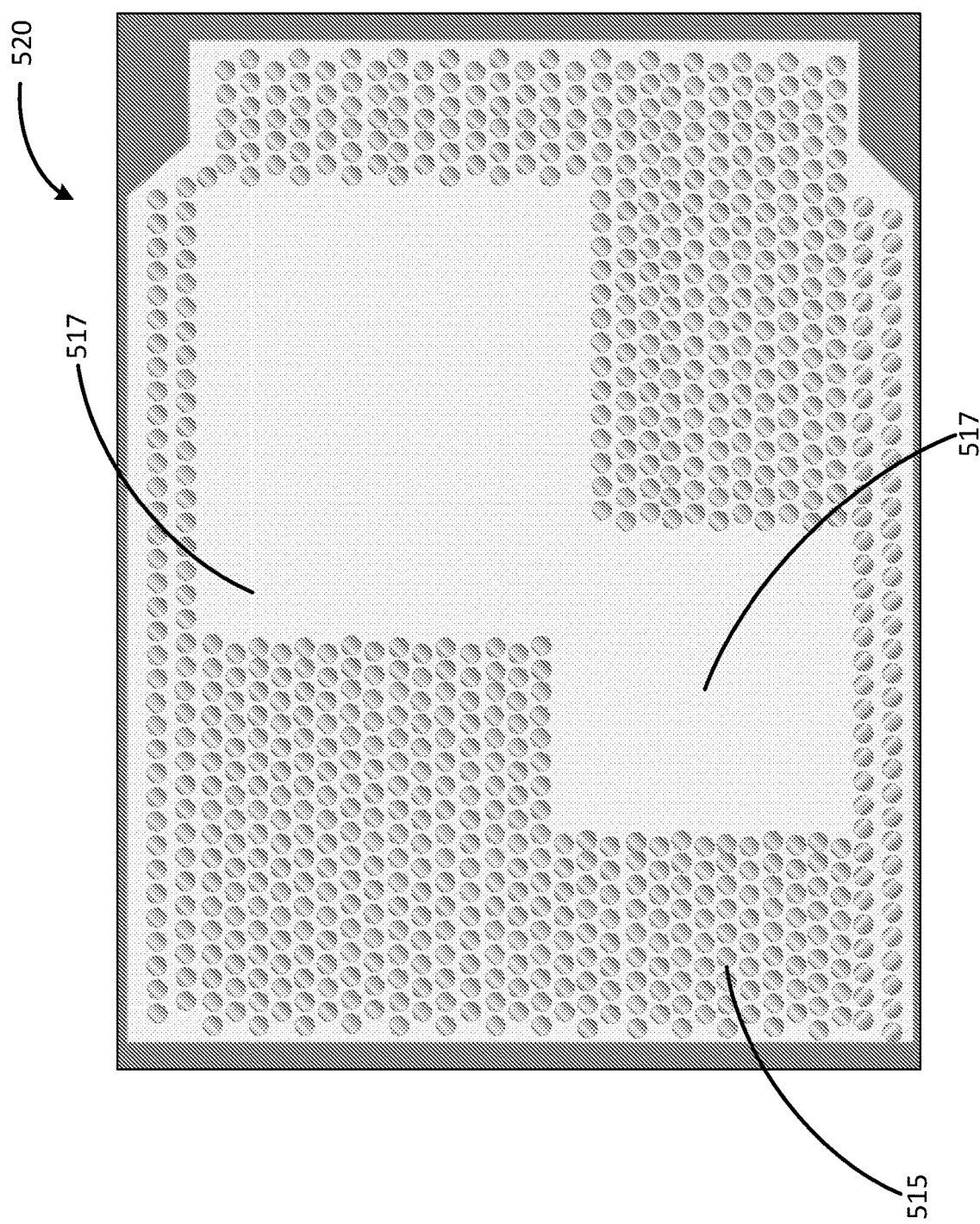
FIG. 5A illustrates a bottom view of an example package prior to attachment of electrical ICs according to various embodiments.
Figure 5B:
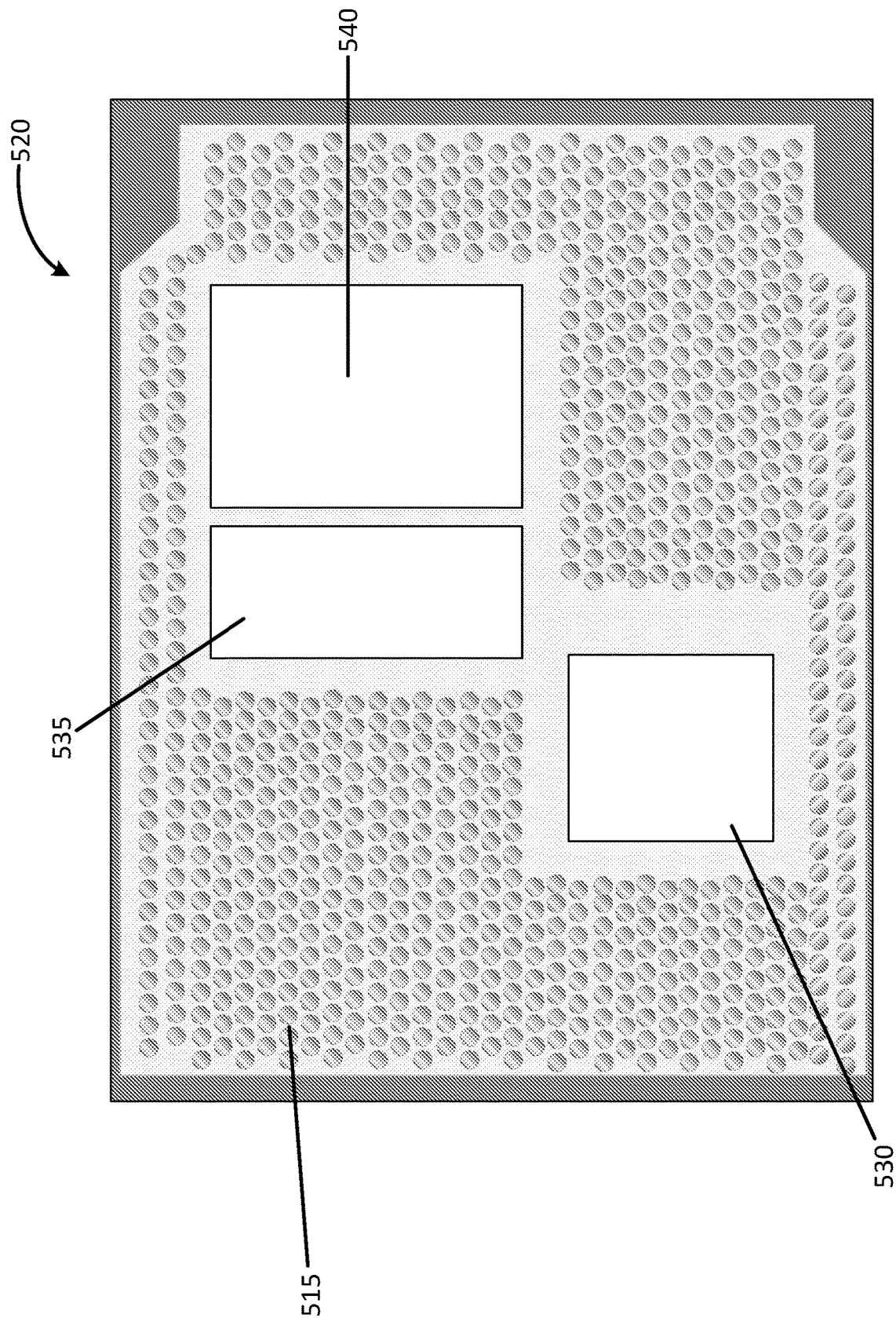
FIG. 5B illustrates the bottom of the example package of FIG. 5A with three electrical ICs attached according to various embodiments.
Figure 5D:
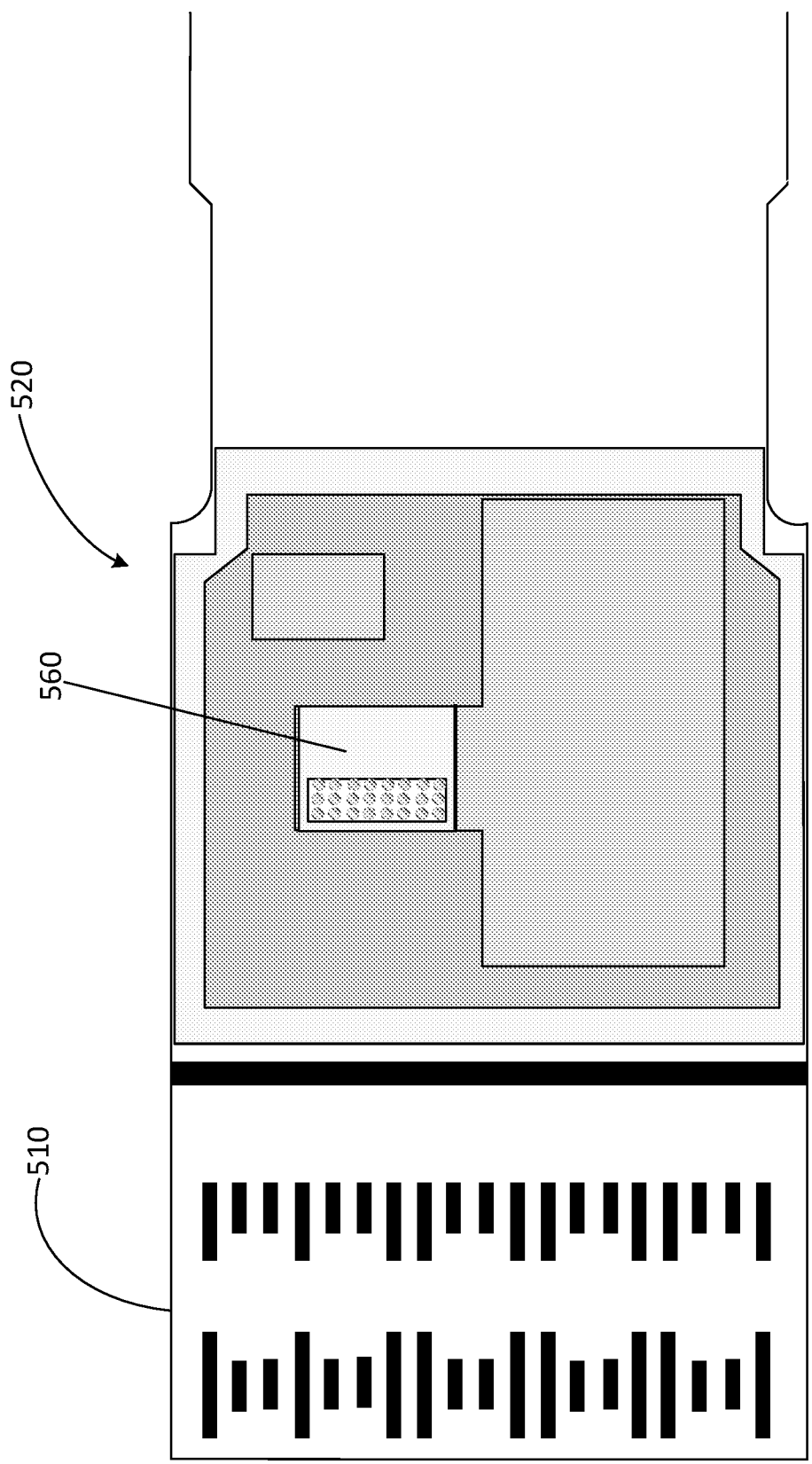
FIG. 5D illustrates a top view of the example package of FIG. 5C, after mating to the PCB below it, and after a photodetector or receiving element has been attached to the top of the package, according to various embodiments.
Figure 5E:
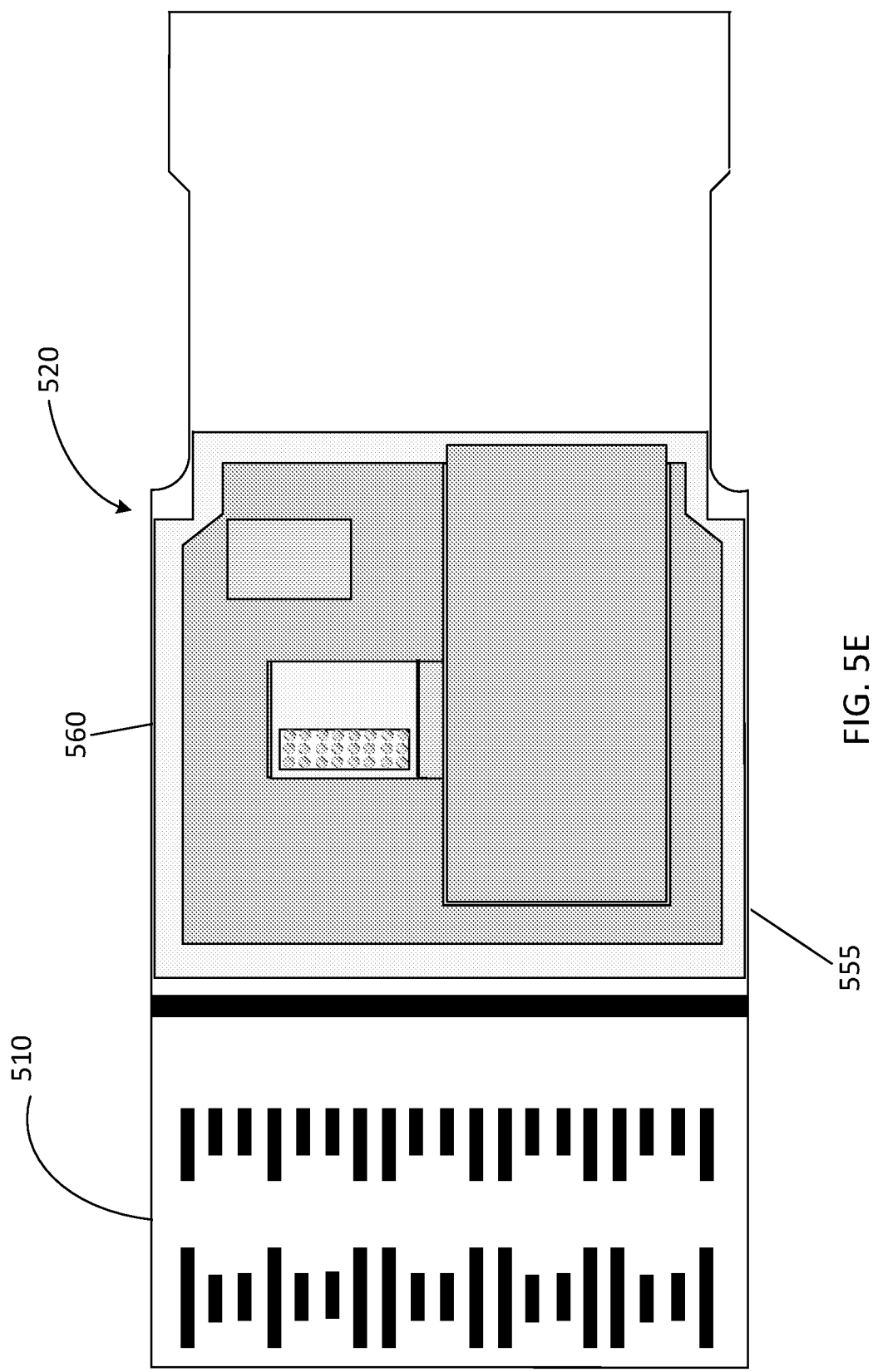
FIG. 5E illustrates the example package of FIG. 5D after a silicon optical transmitter has been attached to the top of the package, adjacent to the photodetector, according to various embodiments.
Figure 5F:
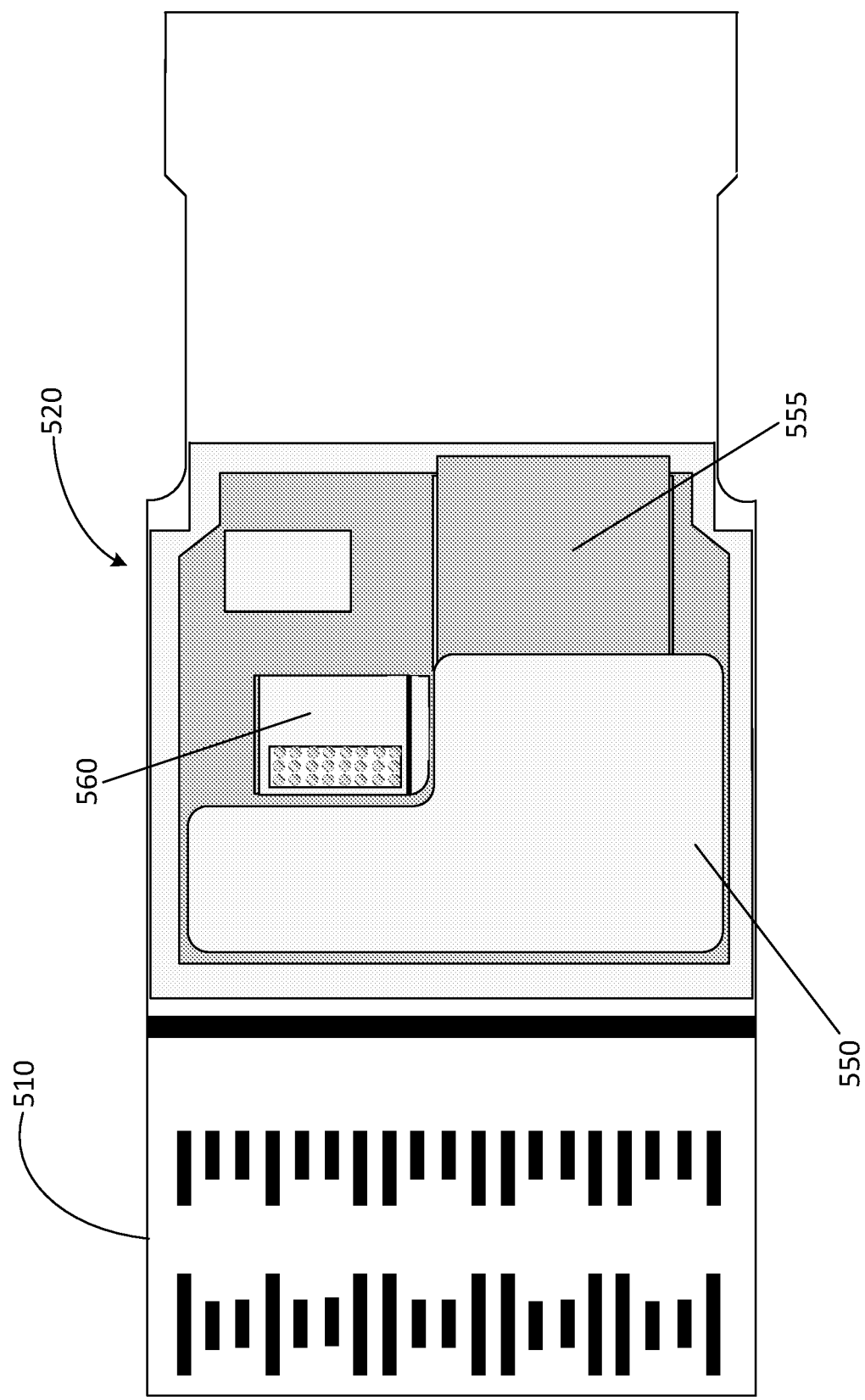
FIG. 5F illustrates the example package of FIG. 5E, after an integrated heat spreader (IHS) has been attached to the top of the package and to a portion of the upper surface of the optical transmitter, according to various embodiments.
Figure 5G:
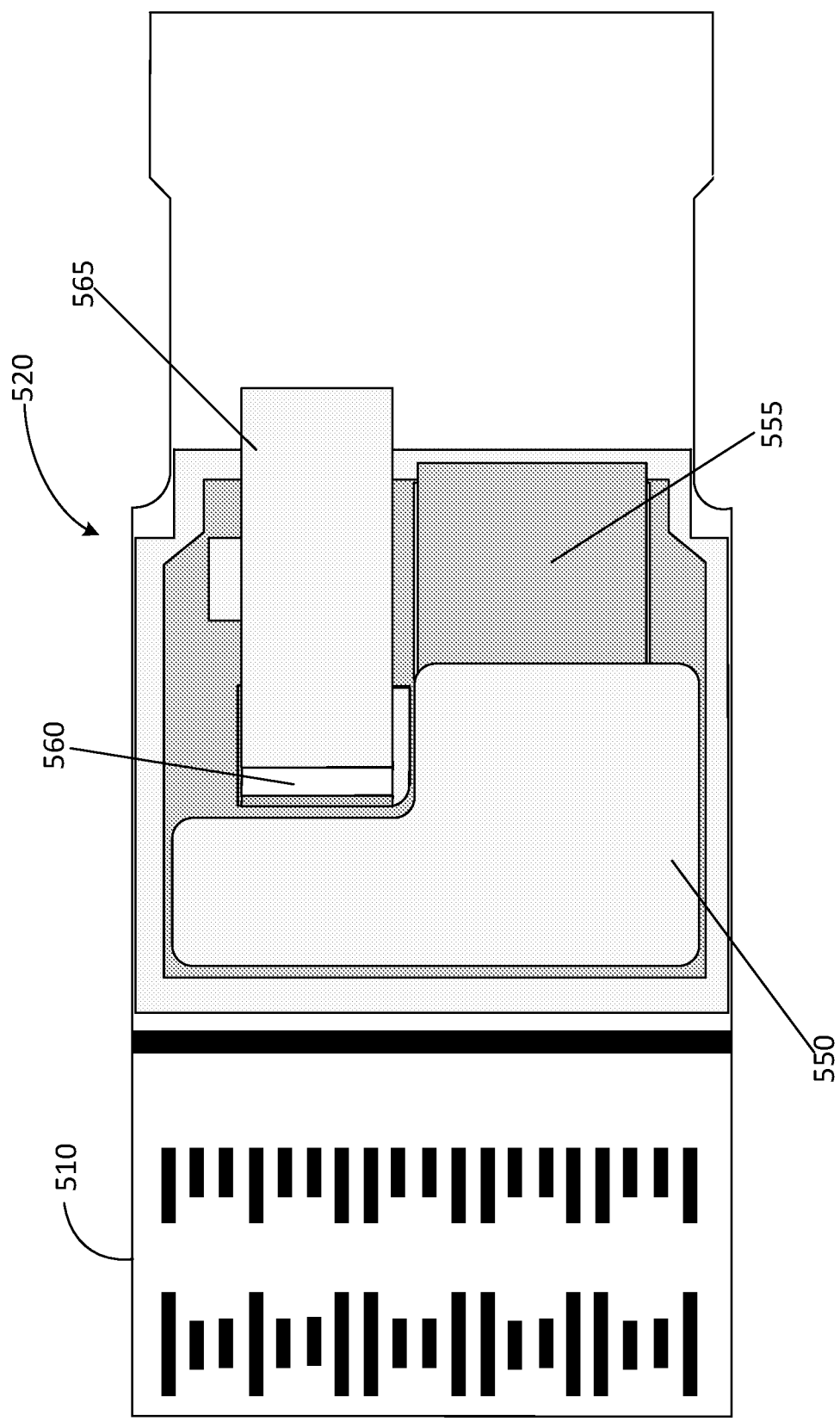
FIG. 5G illustrates the example package of FIG. 5F, after an external demultiplexer has been attached to the photodetector with total internal reflector or mirror to turn the light down into the photodetector lenses, according to various embodiments.
Figure 5H:
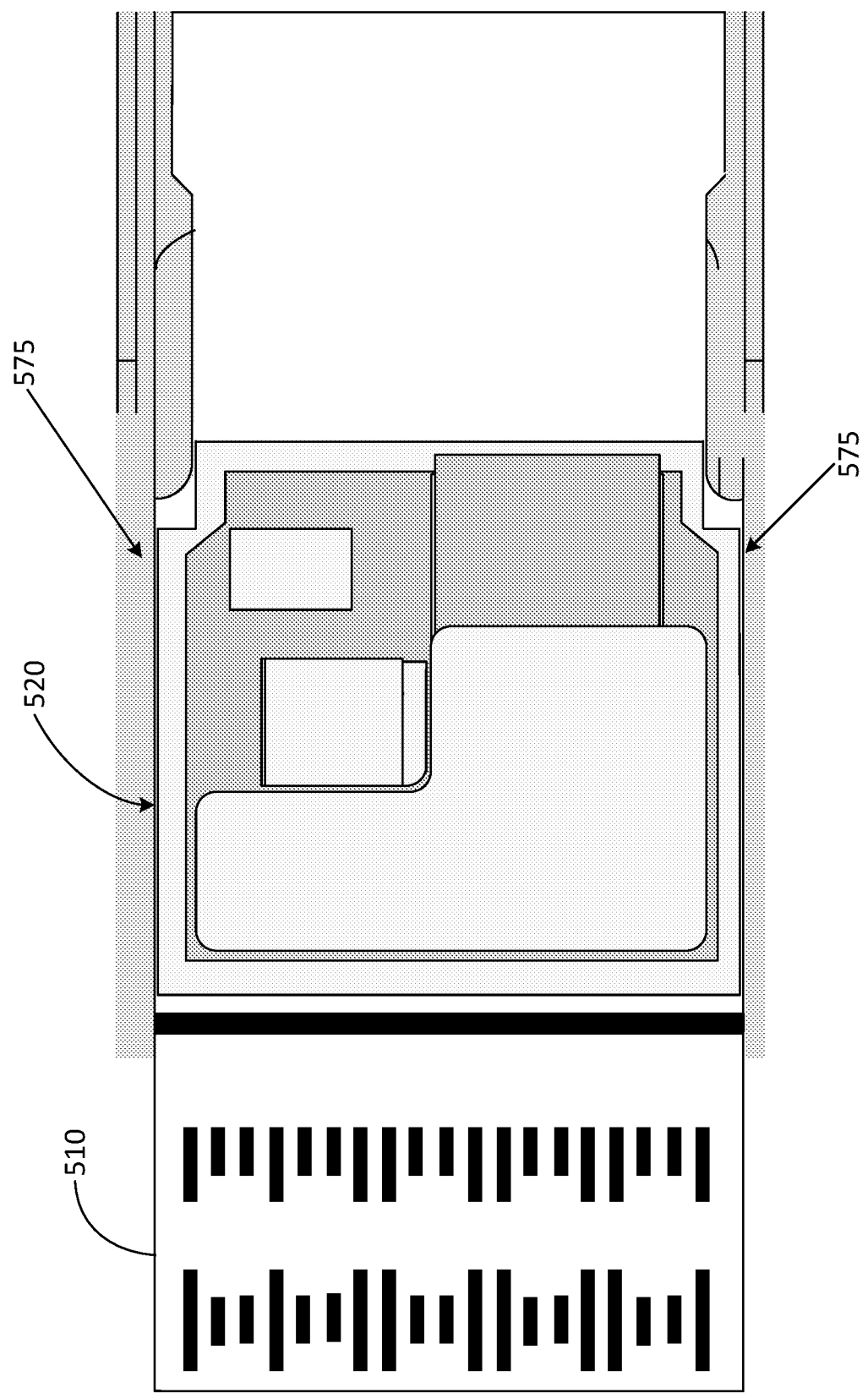
FIG. 5H illustrates the example package of FIG. 5G, as inserted within an example chassis, according to various embodiments.
Figure 5I:
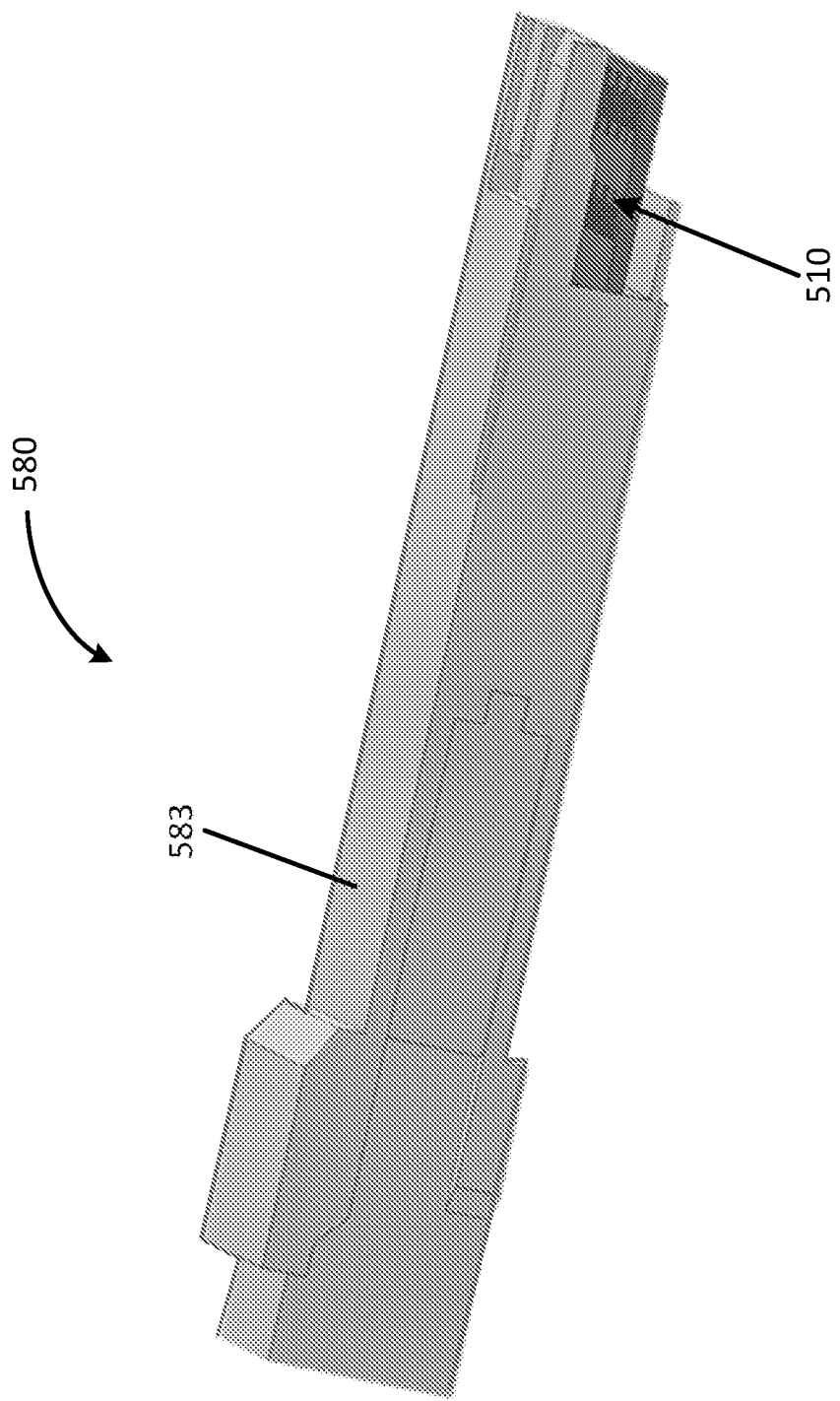
FIG. 5I illustrates the example package assembly of FIG. 5H, as mated to a final housing, according to various embodiments.

FIGS. 5A through 5I, next described, illustrate an example assembly process of an example package assembly (i.e., a package comprising a substrate, mated to a PCB board, with electrical ICs attached on its underside, and optical ICs and an IHS attached to its top side) separated into individual assembly steps, to better illustrate the various components of the example package assembly and how they connect and interrelate, according to various embodiments. After the package has been fully assembled, which is the situation as shown in FIG. 5G, the fully assembled package may be inserted into a chassis, as shown in FIG. 5H, which may be a portion of, or may be inserted into, a housing, as shown in FIG. 5I.

With reference to FIG. 5A, there is shown a bottom view of an example package 520 according to various embodiments. FIG. 5A shows BGA field 515 prior to any electrical ICs being attached to the underside of package 520. Locations 517 indicate where example electrical ICs may be attached, as shown in FIG. 5B.

Continuing with reference to FIG. 5B, there is shown the underside of example package 520 of FIG. 5A after three example electrical ICs have been attached to the bottom of the package and encapsulated. These electrical ICs may comprise, for example, a TX driver 540, a clock and data recovery (CDR) IC 535, and a transimpedance amplifier (TIA) 530. BGA field 515 is also shown, in the areas surrounding the three example electrical ICs.

In embodiments, the electrical IC assembly on the bottom of package 520, shown for example in FIG. 5B, may be attached to an example PCB (not shown) via a standard ball attach process or thermal compression bond process, and an underfill process. In embodiments, the underfill may be a high thermal conductivity underfill so as to help spread the heat, if needed. It is noted that, in embodiments, a chip (or die) in BGA field 515 may also be exposed die molded with a high thermal conductivity mold. In embodiments, solder balls of the BGA field 515 may be placed in either through-mold interconnects (TMI), holes or plated copper (Cu) pillars that are exposed and then subsequently attached with solder balls, and then interconnected to the PCB.

With reference to FIG. 5C, example package 520 is shown as positioned over PCB 510 prior to being mated to PCB 510 (the BGA field and the electrical ICs on package 520 not shown in this figure). PCB 510 has two copper slugs, copper slug 511 provided at a location corresponding to electrical IC 530, and copper slug 513, provided at a location corresponding to electrical ICs 535 and 540, all as shown in FIG. 5B. In embodiments, mating of package 520 with PCB 510 may be effected using surface mount technology (SMT), or alternatively using thermal compression bond technology, and when mated, slugs 519 may thermally couple to electrical ICs 530, 535 and 540 of FIG. 5B, as described below, including in connection with FIG. 6.

FIG. 5D illustrates a top view of package 520, after mating to PCB 510 (and thus following the situation shown in FIG. 5C), and after photodetector 560 has been attached on the top of the package, according to various embodiments. It is noted that photodetector 560 may sometimes be referred to herein as "optical receiver 560."

Continuing with reference to FIG. 5E, there is shown package 520 as assembled in FIG. 5D, thus including photodetector 560, and after a silicon optical transmitter 555 has been attached to the top of the package, according to various embodiments. As may be seen, silicon optical transmitter 555 is provided essentially adjacent to the lower side of photodetector 560, as shown in FIG. 5E.

Continuing with reference to FIG. 5F, there is shown the example package of FIG. 5E, after IHS 550 (also known as a thermal lid) has been attached to the top of the package, including over a portion of the upper surface of optical transmitter 555 (thus shown fully in FIG. 5E, and partially in FIG. 5F), according to various embodiments. It is noted that the shape of IHS 550 as shown in FIG. 5F is wholly exemplary, and in embodiments it may be any shape required. However, it is noted, IHS 550 should not cover all of optical transmitter 555, so as to leave room for an optical coupling apparatus to be attached or coupled to optical transmitter 555. FIG. 5F thus shows package 520 as fully assembled, but without any fiber optic coupling components.

FIG. 5G illustrates an optical coupling apparatus 565 attached to photodetector 560. In embodiments, optical coupling apparatus 565 may be an external demultiplexer. It is noted that, in general, various optical coupling approaches may be used to couple optical signals coming into photodetector 560 and out of optical transmitter 555. These may include, but are not limited to, optical fiber coupling, demultiplexer fiber coupling, lens to fiber coupling multiplexer to fiber coupling and fiber array coupling, for example. Also shown in FIG. 5G are package 520, PCB 510, optical transmitter 555 and IHS 550, all described above.

FIG. 5H illustrates example package 520, provided on top of a portion of a chassis 575. In embodiments, PCB 510 may mate both mechanically and thermally to chassis 575. FIG. 5I illustrates a complete chassis assembly 580, which comprises package 520 (not shown) as mated to PCB 510, and PCB 510 (now mated to package 520) inserted into, and thermally coupled to, a housing 583. The bottom of PCB 510 is seen at the far right of FIG. 5I. The housing may be an optical module that may plug into the back of a rack. Chassis 575 may be a part of housing 583, or, for example, chassis 575 may itself be inserted into housing 583. In embodiments the housing may leverage single mode optical fiber coupling, following standards such as Quad Small Form Factor Pluggable-Double Density ("QSFP-DD") or small form-factor pluggable (SFP), noted above.

Once provided in the housing 583, the optical ICs on the top of the package may be optically coupled to various other optical components in the housing, or to which the housing is communicatively coupled. In embodiments, optical coupling to the optoelectronic ICs on the package may include one or more of optical fiber coupling, demultiplexer fiber coupling (e.g., as shown in FIG. 5G, demux 565 coupled to receiver 560), lens to fiber coupling, multiplexer to fiber coupling, or fiber array coupling, for example. Furthermore the HIS 550 may be thermally coupled to the top of the housing 583 by a second thermal interface material.

As noted above, once the electrical ICs are attached to the bottom of an example package, yielding the underside of the package as shown in FIG. 5B, in embodiments, the package may then be surface mounted to a PCB that has corresponding copper coins or slugs, or alternatively, thermal vias, by dispensing a TIM between the board and the electrical ICs on the underside of the package. In embodiments, the TIM may be, for example, high K underfill, electrically conductive adhesive, or sinterable solder. Alternatively, if the electrical ICs have backside metallization, then solder may be used as a TIM.

Figure 6:
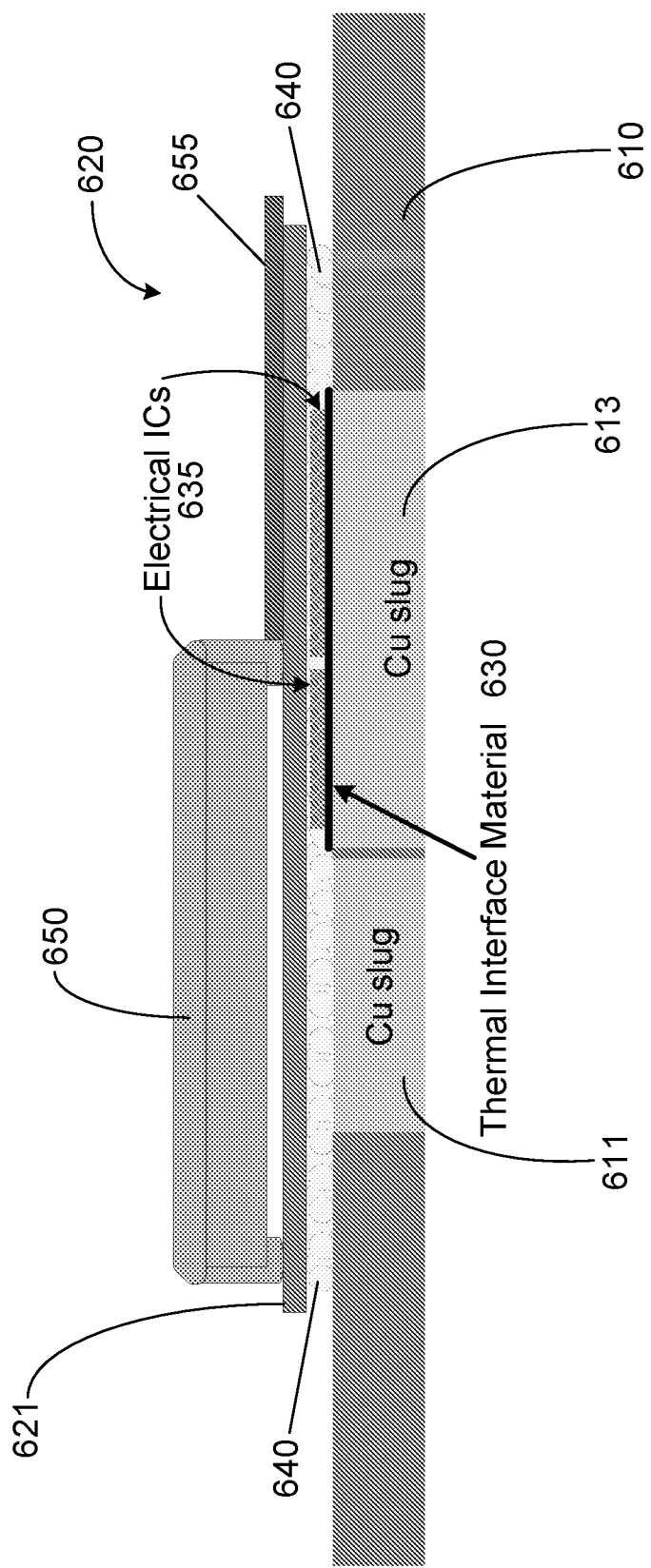
FIG. 6 illustrates a detailed vertical cross sectional view of an example package, according to various embodiments.

FIG. 6 illustrates a detailed vertical cross sectional view of an example package, having had electrical ICs attached to its underside, optical ICs attached to its upper side, and as attached to an example PCB. Thus, FIG. 6 illustrates the situation following what is shown in FIG. 5F, where package 520 has been attached to PCB 510 and the attachment of optical ICs has been completed.

With reference to FIG. 6, example package 620 comprises substrate 621, and on its underside are provided electrical ICs 635 within a BGA 640. A thin layer of thermal interface material (TIM) 630 is shown (as a thick black line provided just below electrical ICs 635 and above copper slug 613). Copper slugs 611 and 613 are provided within PCB 610, as shown. Copper slug 613, provided just below thermal interface material 630, may couple to both electrical ICs 635. The location of copper slug 613 corresponds to copper slug 513 provided within PCB 510 as shown in FIG. 5C. Electrical ICs 635 may include, for example, CDR 235, and (optical transmitter) driver 240, as shown in FIG. 2.

FIG. 6 further shows optical transmitter 655, and HIS 650. Because the view of FIG. 6 is cross-sectional, photodetector 660 is not seen, as it sits behind (form the perspective of FIG. 6) optical transmitter 655. As noted above, IHS 650 may be attached across a portion, for example a majority, of the top of optical transmitter 655. It is noted that, in embodiments, this may be advantageous because the heat generated from the transmitter may thus be spread, and the backside temperature of the transmitter maintained to an acceptable level for integrated laser performance thereby. In embodiments, the IHS may be coupled to the optical transmitter and/or to the upper surface of the package via a mechanically compliant TIM (so as not to apply excessive stress on the joints). In embodiments, this may be particularly important because optical components are often highly sensitive to mechanical stress, as well as temperature. In this context it is noted that during active optical alignment, when the laser emits light and the optical components are aligned with sub-micron accuracy, an optical transmitter may get very hot. This may also occur during module testing. Thus, in such cases, an example IHS may provide a path for active cooling. Furthermore, the IHS (also sometimes known as a "thermal lid") may provide a robust handling surface and may thereby manage stress applied to the transmitter.

Interconnect Designs

As described above with reference to FIGS. 1 and 2, the electrical ICs provided on the underside of package 120, 220, inside BGA field 215 (FIG. 2) may be communicatively coupled with one or more optical ICs 155, 160 coupled to the top side of package 120. In embodiments, this coupling may be via interconnects provided within coreless substrate 121. Example designs for two types of these "electrical IC to optical IC interconnects" are next described. The two types include interconnect structures between, on the one hand, an electrical transmitter (TX) driver chip attached to the bottom of the package and an optical transmitter attached to the top, provided directly above the TX driver chip, and on the other, between an optical receiver (RX) (comprising a photodetector) attached to the top of the package, and an electrical transimpedance amplifier IC attached to the bottom of the package, provided underneath the optical RX photodetector. It is noted that while the interconnects may be provided directly below the optical RX photodetector, the electrical ICs may be staggered. It is further noted that the interconnects depicted in FIGS. 7-9 may also have applicability to other optoelectronic or RF-electronic interfaces.

Figure 7A:
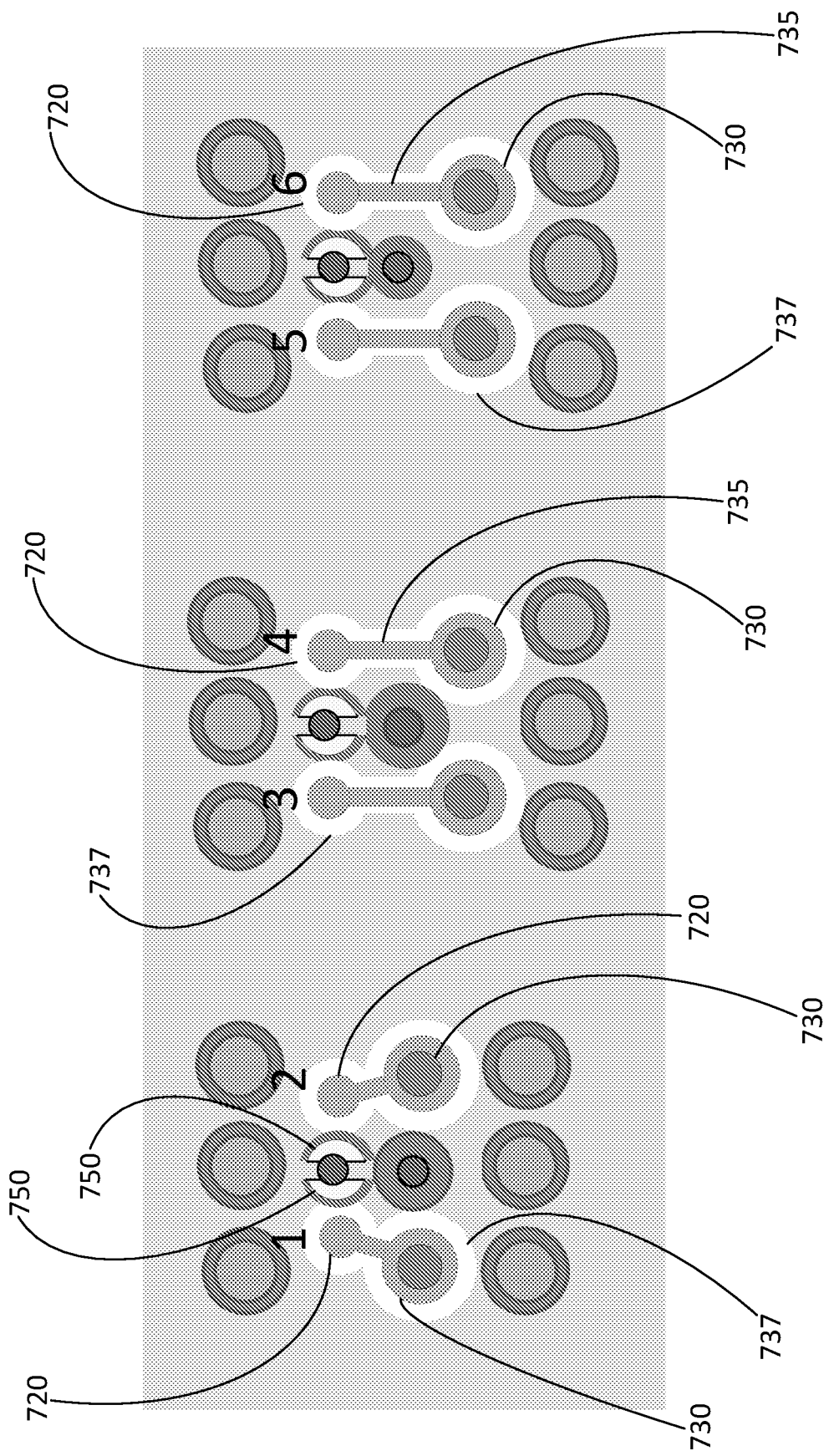
FIG. 7A illustrates example interconnect structures for coupling an example transmitter driver and an optical modulator (provided on the bottom and top of the example coreless package, respectively), according to various embodiments.

FIG. 7A illustrates various examples of an interconnect to couple a differential TX driver, provided under a package substrate, to a modulator provided in an optical transmitter on top of the package's substrate, according to various embodiments. In embodiments, a modulator may have a number of lanes, and several segments across it. For example, a modulator of an example optical transmitter may have eight lanes that feed into a multiplexer on one end, and that connect to lasers at the other end, and may have nine segments across it. FIG. 7A thus shows one of such segments and three of the lanes, and also illustrates three example options for the TX driver-optical modulator interconnect. The three options each include a pair of signal bump pads 720 that are electrically coupled to a corresponding pair of via pads 730. Signal bump pads 720 are also respectively electrically surrounded to ground via bumps 750, which have a trace to the north and south and connect to a surrounding ground plane (shown as 750 in FIG. 7B, labeled "VSS"). In embodiments, each segment may connect to a silicon p-n diode and may be driven to reverse bias by a CMOS inverter in order to achieve a voltage swing. In embodiments, appropriate timing may be imposed by a RF transmission line provided within the TX driver. Thus, the depicted interconnect essentially functions as an unterminated transmission line.

Continuing with reference to FIG. 7A, the three interconnect options are labelled as "Pair (1, 2)" on the left, "Pair (3, 4)" in the center, and "Pair (5, 6)" on the right. Moving in FIG. 7A from left to right, i.e., from "Pair (1, 2)" on the left to "Pair (5, 6)" on the right, it can be seen that the length of the traces 735 from signal bump pads 720 to corresponding via pads 730 increases. For ease of viewing, traces 735 are only labelled in Pair (3, 4) and Pair (5, 6), but it is understood that there is a trace length, albeit smaller, in Pair (1, 2) as well. In embodiments, adjustment of the trace length allows for tunability of high-speed performance through modulation of inductance and capacitance in the interconnect structure. As noted, the overall bump-to-plane signaling path 750 surrounds the 720 signal pairs by ground, ultimately forming a C-shaped, half-turn inductor through the thickness of the coreless substrate. In embodiments, voiding 737 (colored white in FIG. 7A) provided around the signal nets may be adjusted as well. More voiding typically both decreases capacitance and increases inductance, and thus, in embodiments, an optimal amount of voiding may be used.

Figure 7B:
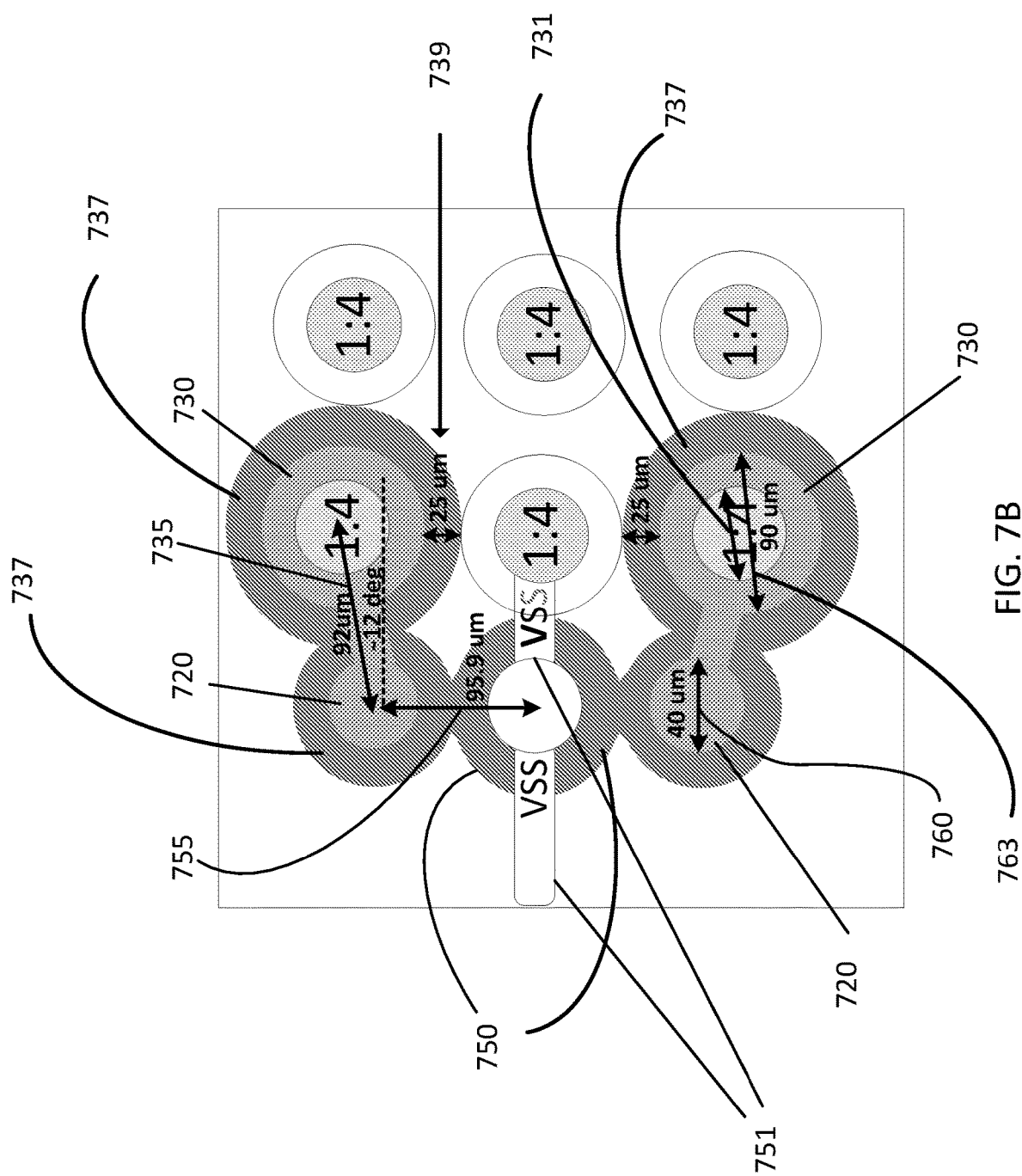
FIG. 7B illustrates example dimensions for one of the example interconnect structures shown in FIG. 7A.

FIG. 7B provides example dimensions for the "Pair (1, 2)" option of FIG. 7A. It is noted that the relative dimensions of the various interconnect elements affect the functionality of the example structure, and are thus modifiable as long as the relative aspect ratios are maintained. The label "1:4" indicates that there is a layer 1 of copper connected through every layer to a copper layer 4 by vias as shown in FIG. 4. It is noted that the orientation of "Pair (1, 2)" as shown in FIG. 7B is a 90 degree counterclockwise turn relative to that of FIG. 7A, for ease of viewing, and appreciation of the symmetry. Because the structure of FIG. 7B is symmetric about a horizontal line running through ground plane 751, for the most part elements of the drawing are on only labelled on one side of that line, it being understood that the same elements also appear on the other side.

Continuing with reference to FIG. 7B, there are shown signal bump pads 720, and corresponding via pads 730. The trace length 735 between the two may be, as shown, 92 um. Signal bump pads 720 are each surrounded by ground plane 751 and a bump 750 which, as noted, has traces extending horizontally to ground planes 751. The center to center distance between them, shown as line 755, may be 95.9 um, for example. Moreover, center to center line 755 may make an obtuse angle with trace length line 735 that runs between signal bump pads 720 and corresponding via pads 730. This angle allows the via pads to "fan out" away from the central line of symmetry of the structure to tune the inductance and capacitance while not violating standard via-pitch design rules for the package technology. In this example interconnect structure the angle between distance line 755 and trace length 735 may be approximately 112 degrees, as shown (or, put another way, trace length 735 may be 12 degrees off of a horizontal line perpendicular to distance 755, as shown). Diameter 760 across signal bump pads 720 may be 40 um, for example, and the overall diameter 763 across via pads 730 may be 90 um. This overall diameter may include a via diameter 731 of 50 um, which the pad then captures. Finally, in embodiments, the width of the void space 739 (dielectric only space) may be 25 um, for example. This dimension may be used, in embodiments, for voids 737, as shown.

In embodiments, besides the trace length 735 from signal bump pads 720 to corresponding via pads 730, which, as shown in FIG. 7B may be 92 um for the Pair (1, 2) option. All other example dimensions provided in FIG. 7B may also be used for each of Pairs (3,4) and (5,6) as well, pending electrical performance needs and die layout.

Figure 8:
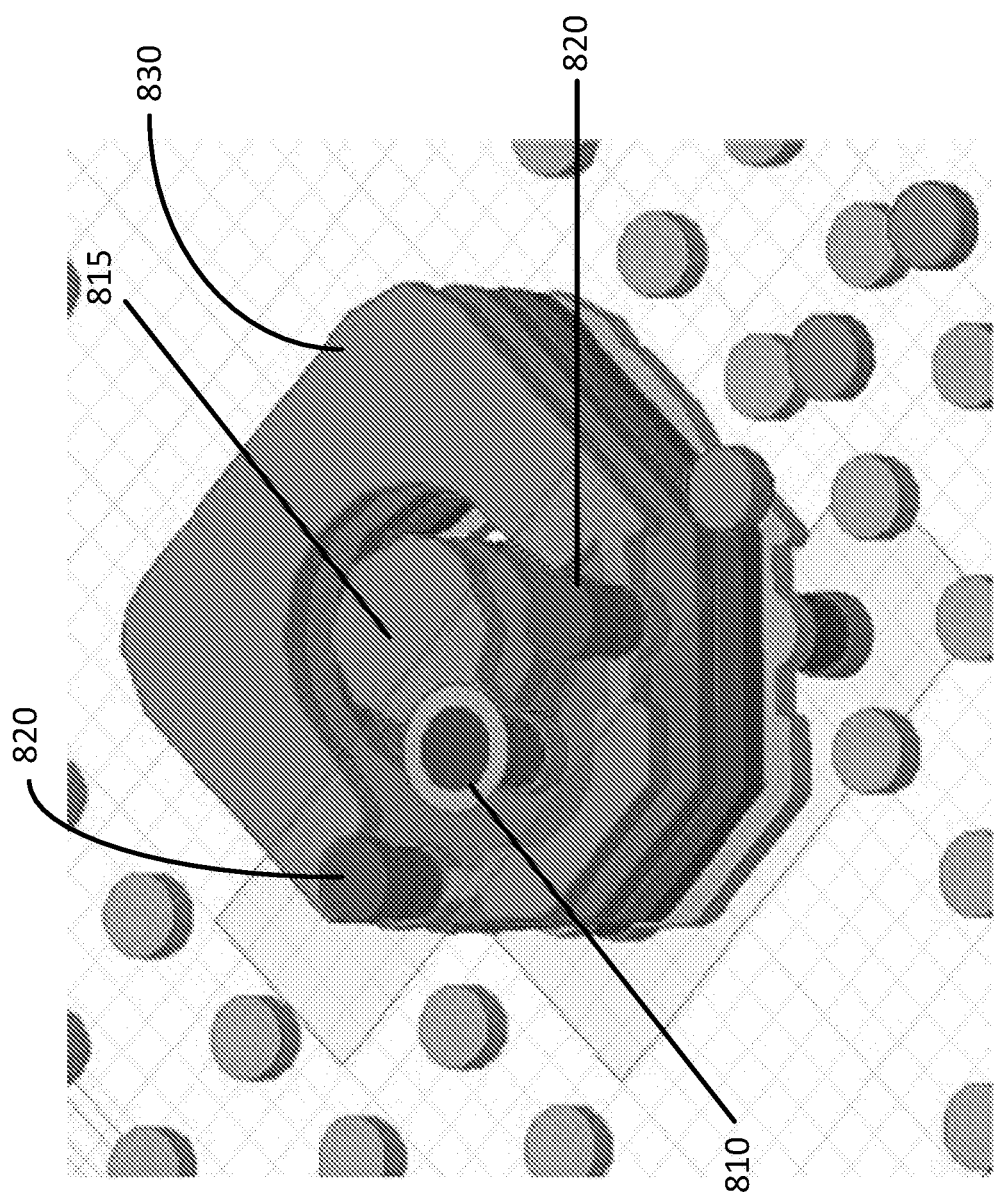
FIG. 8 illustrates an isometric view of an example metal structure to couple a receiver photodetector (to be attached on top of an example coreless package) and a transimpedance amplifier (to be attached to the bottom of an example coreless package), according to various embodiments.

Next described, with reference to FIG. 8, is an example interconnect between an example RX photodetector, such as 360 in FIG. 3, and an example TIA provided beneath it, such as TIA/CDR 230 of FIG. 2. FIG. 8 depicts an isometric view of the metal structures between RX photodetector 360 (to be attached on top) and TIA 230 (to be attached at bottom) according to various embodiments. With reference thereto, extended cathode structure 830 connected to photodetector cathode 820 fully surrounds anode 810 bump to via pad 815, which may be provided in the center of extended anode structure 830 on all metal layers (each metal layer being shown in a different shading through the thickness of the package). Photodetector anode bump pad 810 may be electrically coupled to the anode 815, as shown. In embodiments, this "extended cathode surrounding central anode" structure may function as a "micro-coaxial" vertical interconnect. In embodiments, the depicted structure may provide shielding of a small and sensitive photocurrent as it travels downwards from the photodetector to the TIA through the micro-coaxial vertical interconnect.

Figure 9:
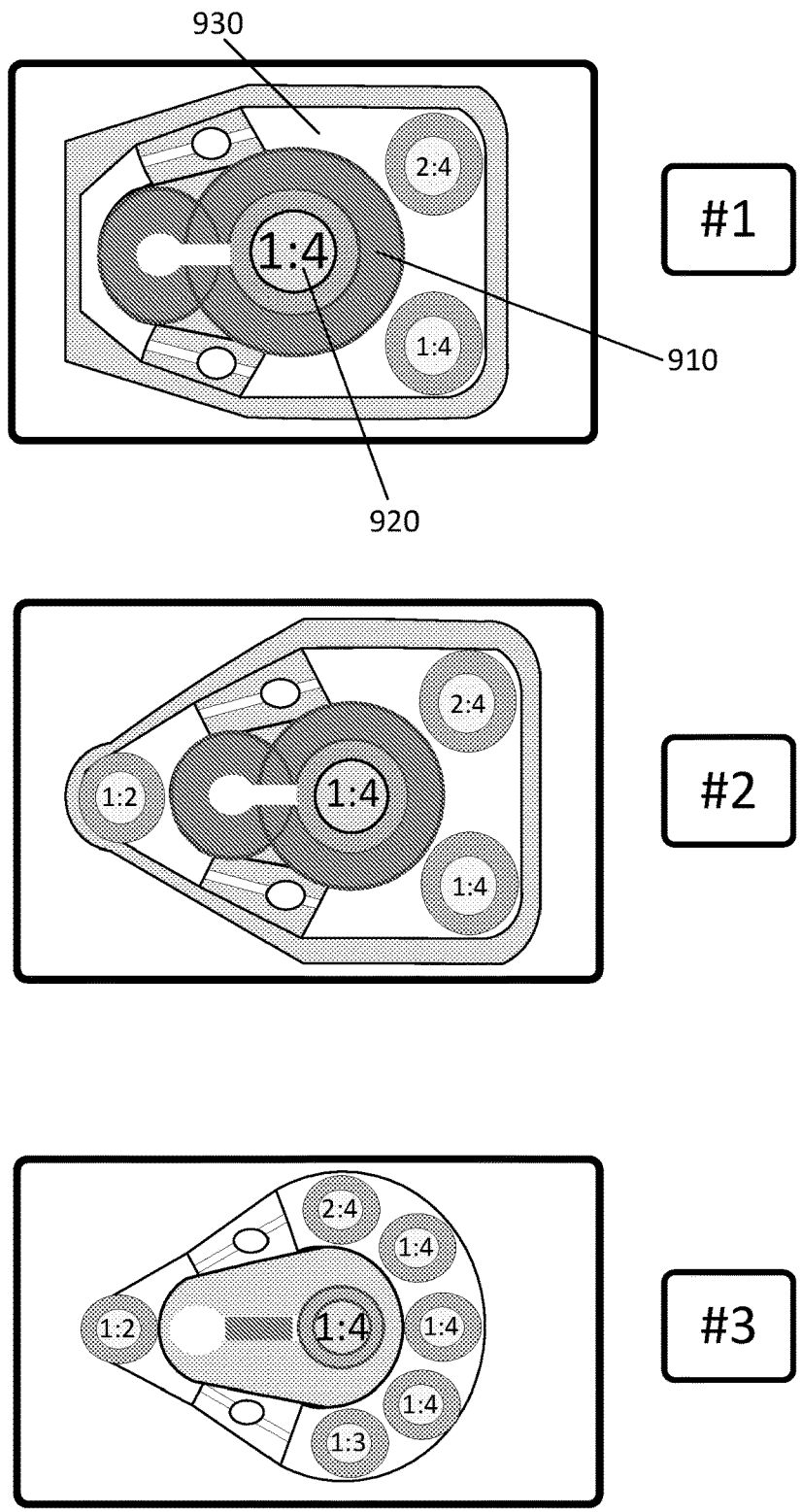
FIG. 9 illustrates various options for the example metal structure of FIG. 8 that vary as to number of stitching vias.

FIG. 9 illustrates variations of the interconnect structure shown in FIG. 8. As shown in FIG. 9, three options of the interconnect are shown, each with a different number of stitching vias. It is here noted that in order to create a pure coaxial cable through the package, the wall surrounding the anode would have to be solid. In package technology this may present difficulties, so a better approach may be to increase the number of via and pad stacks to create a kind of "jail cell" like walls instead. In embodiments, varying the number of stitching vias of the extended cathode structure of FIG. 8 may be used to fine tune performance of the interconnect. This is because more vias provide better shielding and lower inductance, but also higher capacitance. The optimum number is generally circuit, frequency or application dependent. FIG. 9 presents three options: Option 1 comprises two stitching vias 950, Option 2 four stitching vias, and in Option 3 there are six stitching vias (stitching vias in Options 2 and 3 not labelled). The stitching vias are provided in extended cathode structure 930, in each case. It is noted that, in embodiments, a greater number of vias may lead to less inductance and better shielding of noise from other structures in the substrate. In embodiments, the voiding 910 (shown as dark black) between extended cathode structure 930 and (central) anode 915, and the number and arrangement of the interlayer vias, may be used to fine tune the high-frequency performance of the structure.

Simulation Results

An example design of a package according to an embodiment was performed by the inventors, and a working process of record (POR) process flow and material set, using simulations and a GRC test vehicle was established. Power delivery and high speed signal integrity simulations, as well as thermal simulations and mechanical simulations were performed, and high-speed input/output (HSIO) interfaces were simulated and seen to perform well at speeds greater than 50 Gb/s. Eye diagrams illustrating the simulation results are next described.

Figure 10A:
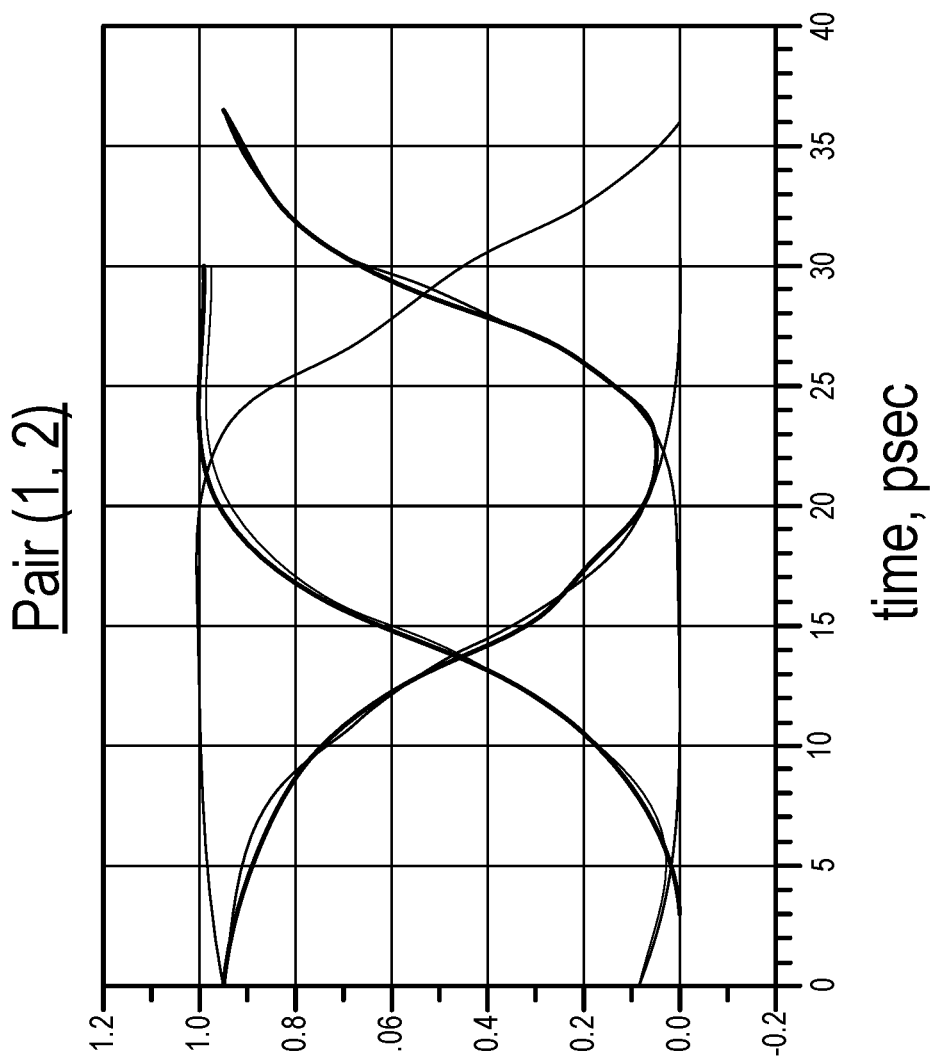
FIG. 10A illustrates an example eye diagram at 53.125 Gb/s for a vertical differential transmitter driver to modulator interface for the (1, 2) pair shown in FIG. 10, according to various embodiments.
Figure 10B:
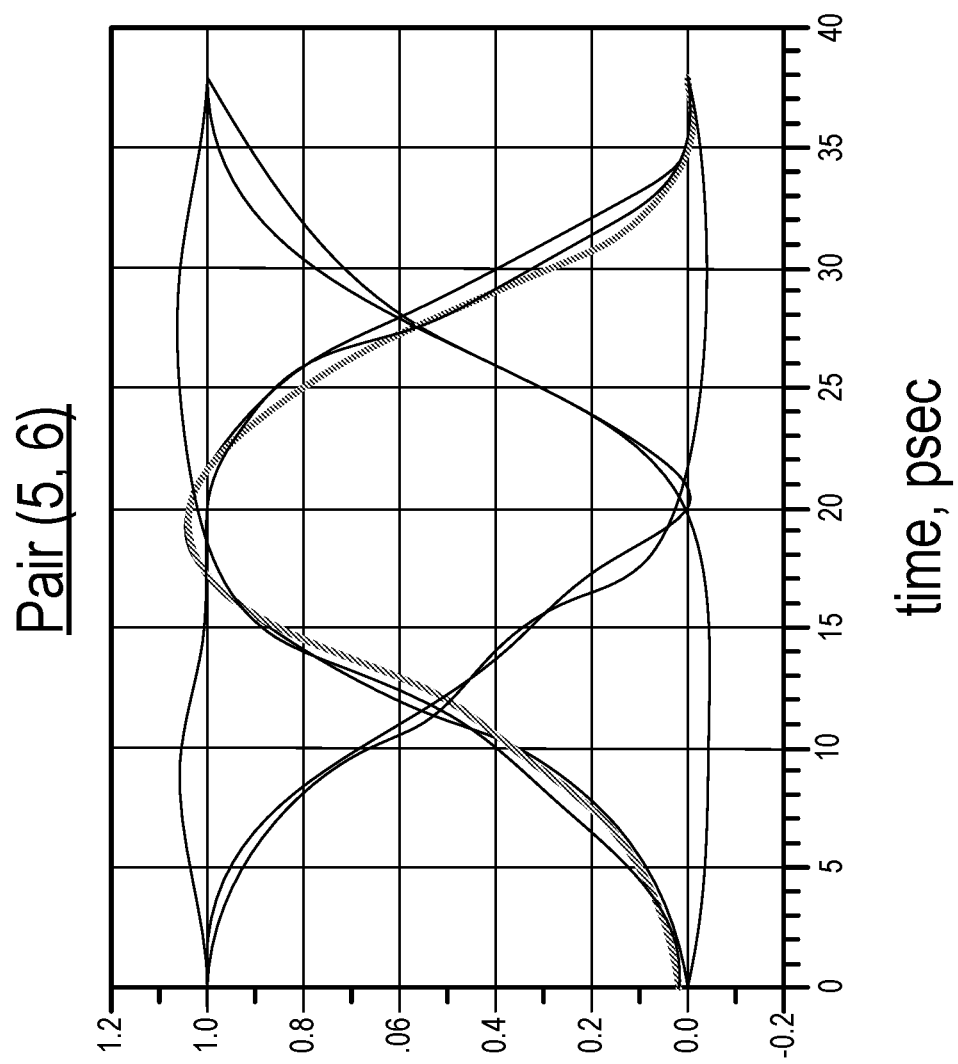
FIG. 10B illustrates an example eye diagram at 53.125 Gb/s for a vertical differential transmitter driver to modulator interface for the (5, 6) pair shown in FIG. 10, according to various embodiments.

FIGS. 10A and 10B depict example eye diagrams at 53.125 Gb/s for the vertical differential TX driver to modulator interface for each of Pairs (1,2) and (5,6), respectively. Here the interconnect in the coreless package for "Pair (5,6)" was designed to provide more inductance than for "Pair (1,2)" (both pairs shown above, FIG. 12), which, in embodiments, may compensate parasitic on-die capacitances and provide faster rise time and larger eye height, at the expense of some overshooting and increased jitter. This illustrates the signal integrity optimization that may be possible with a coreless package architecture according to various embodiments.

Figure 10C:
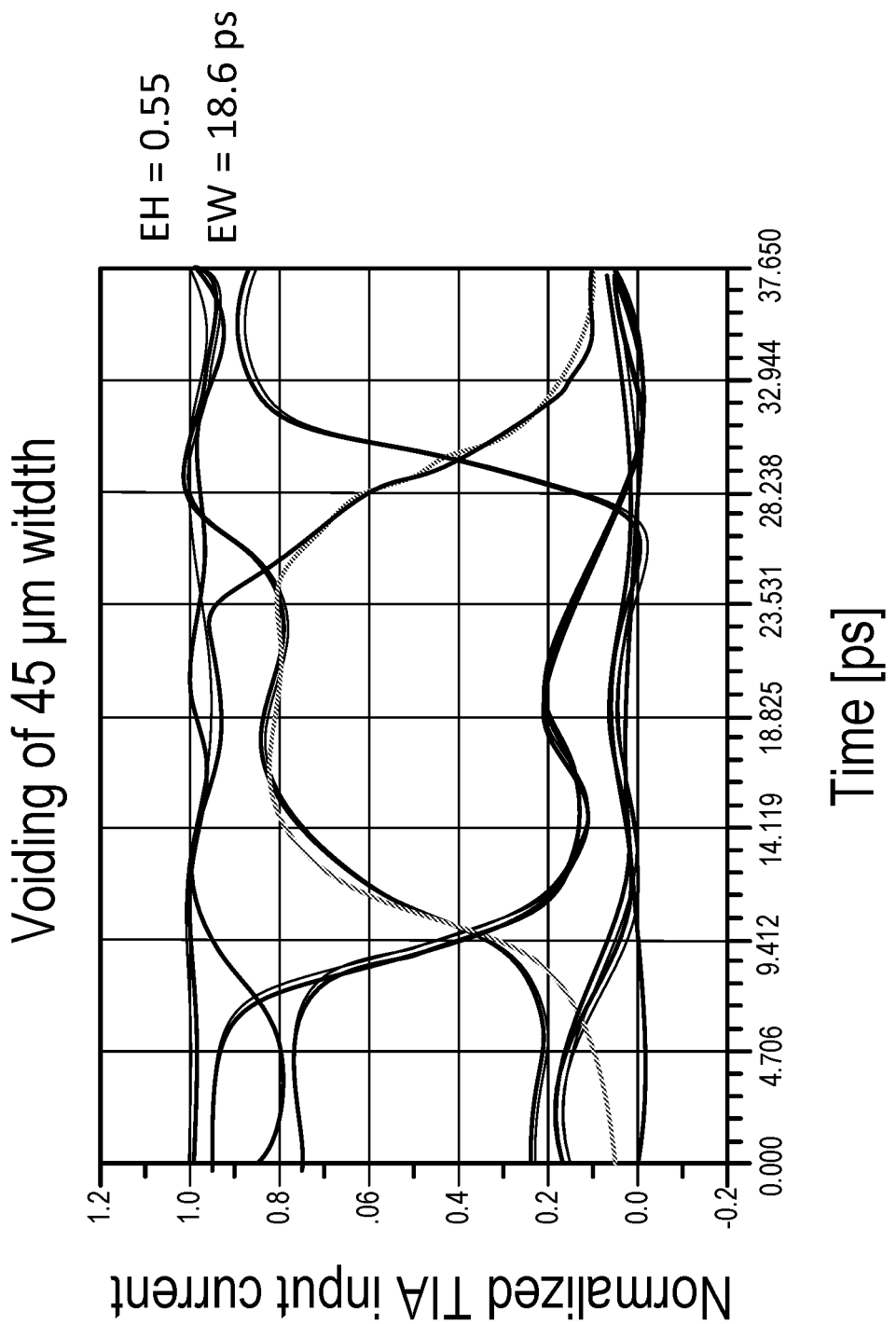
FIG. 10C illustrates an example eye diagram at 53.125 Gb/s for a photocurrent from a photodetector on top of an example package through the coreless package substrate to the input of the transimpedance amplifier at the package bottom according to various embodiments.

In embodiments, at the RX side, the photocurrent from a photodetector atop the package, such as photodetector 130 in FIG. 1, may be funneled through a coreless package substrate, such as 120 in FIG. 1, to the input of a TIA, such as 230 in FIG. 2, at the bottom. FIG. 10C depicts an eye diagram for such a photocurrent, also at 53.125 Gb/s. It is noted in connection with the eye diagram of FIG. 10C, that even though capacitive mismatch may cause some eye height degradation, in this example the eye is wide open with an eye width of 98.8%. The inventors also simulated power delivery for this example, and 15 or 18 um thick copper planes contemplated according to various embodiments were seen to provide an advantage over the 2-10 um thick copper typical in backend wafer fabrication.

Finally, it is noted, a thermal solution was also simulated for this example. In embodiments, a temperature drop between the active side of the bottom ICs may be minimized by leveraging a thermal slug in board and an adhesive thermal interface material (TIMB) between the die and the board. Furthermore, in embodiments, by applying a copper thermal lid (IHS) above the opto-electronics, and in particular above the laser region, at the top of an example coreless package, stress and thermals on the laser region may be managed throughout testing, active optical alignment and operation to achieve an acceptable temperature by utilizing a custom TIM material that has compliancy and low-outgassing properties. In embodiments, a polymer TIM may be the same material that is used in some CPUs, such as may be manufactured by Intel®.

It is noted that when a coreless package architecture is used to enable opto-electronic multi-chip packages, as in various embodiments, when compared to a fan-out approach, a coreless approach allows the utilization of thicker metal to enable better power delivery design, and a method to optimize inductance and capacitance between die and package to meet high bandwidth drive or amplification schemes, as described above.

It is further noted that as compared to an active interposer or monolithic approach, a coreless package approach avoids problems seen in a monolithic die solution. The latter may require either using sub-optimized technology or heterogeneous process integration on one silicon substrate. Moreover, it is noted that through silicon vias (TSVs) may limit the active area available without interruption through a transistor stack and hence may drive larger interposer size with disparate design rules. It is also noted that passive interposers may also have inherent power delivery and high speed signaling challenges due to TSV capacitance and inductance limitations.

Thus, in embodiments, a coreless implementation may be provided in various opto-electronic devices, such as, for example, those used in data centers, or in various other systems, networks, devices and apparatuses where the movement of large packets of data is needed or desired.

For example, an internet data center may be structured in a layered format, with rows of servers within multiple racks, and each server and rack connecting through a switch. These rack switches may then connect to each other, and ultimately to a service provider's network. The connections between these top-of-rack switches, and to the service provider's network, are increasingly done with higher-capacity optical networking technology. This is because legacy copper cables can carry signals at distances adequate to meet most needs within an enterprise or internet data center at speeds up to about 1 gigabit per second. However, at speeds of 10 gigabits per second and above, the signals sent over copper cables experience increasing attenuation and dispersion over distances common in large internet data center environments, making copper much less effective as a transmission medium An example computing apparatus is described below, with reference to FIG. 11. Some components of the example apparatus may include embodiments of the opto-electronic device described above, such as, for example, a CPU, a hardware accelerator, communication devices, input/output devices, or mass storage.

Figure 11:
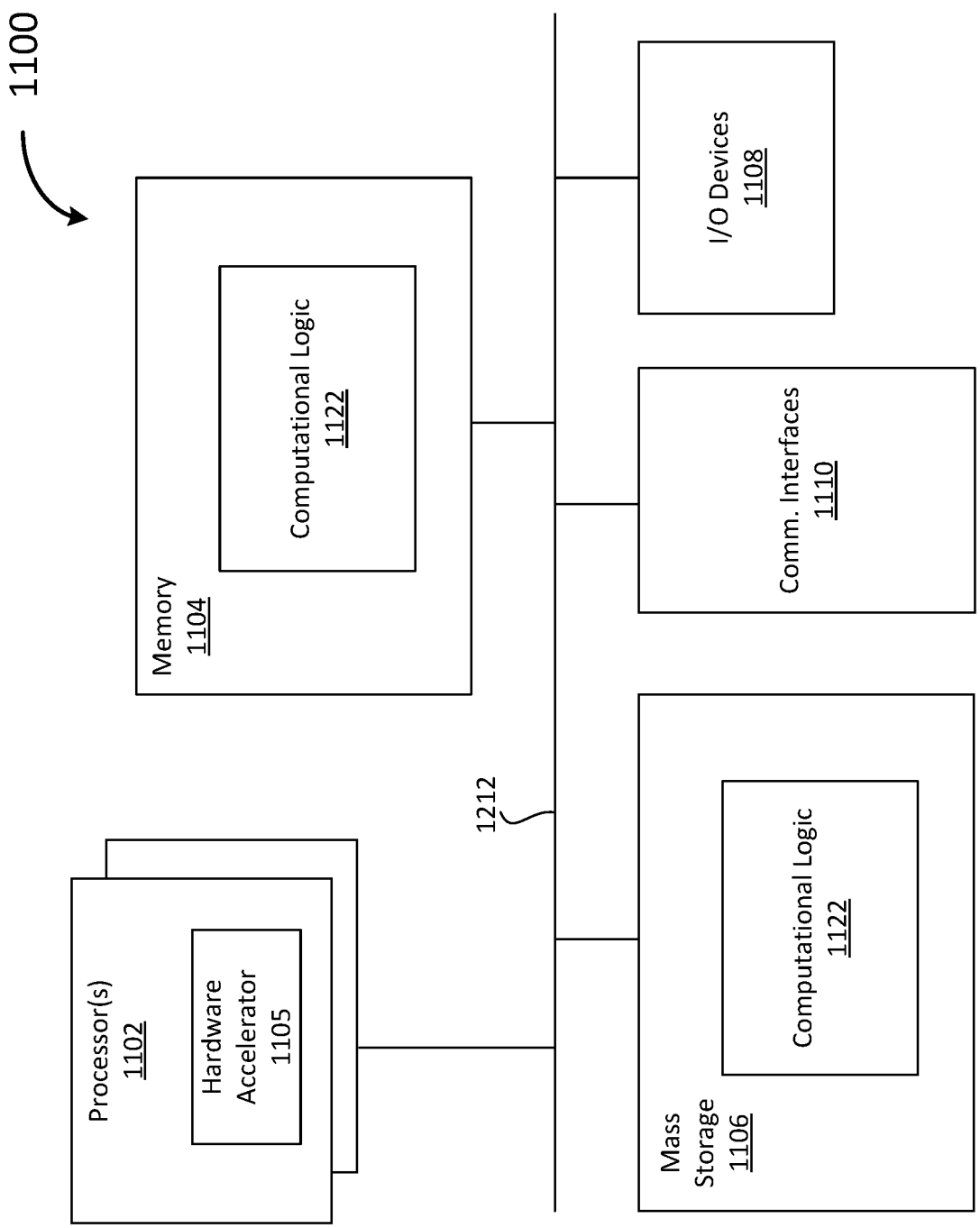
FIG. 11 illustrates a block diagram of a computer device suitable for practicing the present disclosure, in accordance with various embodiments.

Thus, FIG. 11 illustrates a block diagram of an example computing device 1100 suitable for use with various components described herein. As shown, computing device 1100 may include one or more processors or processor cores 1102 and system memory 1104. For the purpose of this application, including the claims, the terms "processor" and "processor cores" may be considered synonymous, unless the context clearly requires otherwise. The processor 1102 may include any type of processors, such as a central processing unit (CPU), a microprocessor, and the like. The processor 1102 may be implemented as an integrated circuit having multi-cores, e.g., a multi-core microprocessor. The computing device 1100 may include mass storage devices 1106 (such as diskette, hard drive, volatile memory (e.g., dynamic random-access memory (DRAM), compact disc read-only memory (CD-ROM), digital versatile disk (DVD), and so forth). In general, system memory 1104 and/or mass storage devices 1106 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1100 may further include I/O devices 1108 (such as a display (e.g., a touchscreen display), keyboard, cursor control, remote control, gaming controller, image capture device, and so forth) and communication interfaces 1110 (such as network interface cards, modems, infrared receivers, radio receivers (e.g., Bluetooth), and so forth).

The communication interfaces 1110 may include communication chips (not shown) that may be configured to operate the device 1100 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1110 may operate in accordance with other wireless protocols in other embodiments. In various embodiments, the communication interfaces 1110 may include a transceiver 1152. In some embodiments, the transceiver 1152 may be coupled with other components of the computer device 1100 and/or may not be included within the communication interfaces 1110.

The above-described computing device 1100 elements may be coupled to each other via system bus 1112, which may represent one or more buses. In the case of multiple buses, they may be bridged by one or more bus bridges (not shown). Each of these elements may perform its conventional functions known in the art. In particular, system memory 1104 and mass storage devices 1106 may be employed to store a working copy and a permanent copy of the programming instructions for the operation of various components of computing device 1100, including but not limited to an operating system of computing device 1100 and/or one or more applications. The various elements may be implemented by assembler instructions supported by processor(s) 1102 or high-level languages that may be compiled into such instructions.

The permanent copy of the programming instructions may be placed into mass storage devices 1106 in the factory, or in the field through, for example, a distribution medium (not shown), such as a compact disc (CD), or through communication interface 1110 (from a distribution server (not shown)). That is, one or more distribution media having an implementation of the agent program may be employed to distribute the agent and to program various computing devices.

The number, capability, and/or capacity of the elements 1108, 1110, 1112 may vary, depending on whether computing device 1100 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1104 may include computational logic 1122 configured to implement various firmware and/or software services associated with operations of the computing device 1100. For some embodiments, at least one of processors 1102 may be packaged together with computational logic 1122 configured to practice aspects of embodiments described herein to form a System in Package (SiP) or a System on Chip (SoC).

In various implementations, the computing device 1100 may comprise one or more components of a data center, a laptop, a netbook, a notebook, an ultrabook, a smartphone, a tablet, a personal digital assistant (PDA), an ultra-mobile PC, a mobile phone, or a digital camera. In further implementations, the computing device 1100 may be any other electronic device that processes data.

For an embodiment, at least one of processors 1102 may be packaged together with memory having all or portions of computational logic 1122 configured to practice aspects shown or described herein. For an embodiment, at least one of processors 1102 may be packaged together with memory having all or portions of computational logic 1122 configured to practice aspects described herein to form a System in Package (SiP). For an embodiment, at least one of processors 1102 may be integrated on the same die with memory having all or portions of computational logic 1122 configured to practice aspects described herein. For an embodiment, at least one of processors 1102 may be packaged together with memory having all or portions of computational logic 1122 configured to practice aspects herein to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an optoelectronic apparatus comprising: a package including a substrate with a first side and a second side opposite the first side, wherein the first side comprises a ball grid array (BGA) field; one or more integrated circuits (ICs) disposed on the first side of the coreless substrate within the BGA field that thermally interface with a printed circuit board (PCB), to which the package is to be coupled; and one or more optical ICs coupled to the second side and communicatively coupled with the one or more ICs via interconnects provided in the coreless substrate, wherein at least one of the optical ICs is at least partially covered by an integrated heat spreader (IHS), to provide dissipation of heat produced by the at least one optical IC.

Example 2 may include the apparatus of example 1, and/or other examples herein, wherein the ICs include one or more of a transceiver or transmitter driver, a transimpedance amplifier (TIA) or a clock and data recovery (CDR) circuit.

Example 3 may include the apparatus of either of examples 1 or 2, and/or other examples herein, wherein the one or more optical ICs include an optical transmitter or an optical receiver.

Example 4 may include the apparatus of example 3, and/or other examples herein, wherein at least one of the ICs is to communicate at frequencies between 10 and 200 Gigahertz (GHz) through the substrate to an optical transmitter provided on an upper surface of the substrate.

Example 5 may include the apparatus of example 3, and/or other examples herein, wherein at least one of the ICs is to communicate at a rate greater than or equal to 56 Gigabytes per second (Gbps) through the substrate to at least one of the optical ICs.

Example 6 may include the apparatus of example 3, and/or other examples herein, wherein the IHS partially covers the optical transmitter and is coupled to it via a mechanically compliant thermal interface material.

Example 7 may include the apparatus of example 3, and/or other examples herein, wherein the package is fabricated according to standard Flip Chip-Chip Scale Packages (FC-CSP) substrate technology standards.

Example 8 may include the apparatus of example 1 and/or other examples herein, wherein the ICs on the first side of the package are to contact a copper plane connected to vias, slugs or coins in the PCB via a thermal interface material (TIM).

Example 9 may include the apparatus of example 8, and/or other examples herein, and/or other examples herein, wherein the TIM is at least one of: high K underfill, electrically conductive adhesive or sinterable solder.

Example 10 may include the apparatus of example 8, and/or other examples herein, wherein the ICs on the first side of the package have back-side metallization, and the TIM is solder.

Example 11 may include the apparatus of example 1, and/or other examples herein, wherein the substrate is coreless, and comprises a prepreg substrate.

Example 12 may include the apparatus of example 11, and/or other examples herein, wherein the prepreg substrate includes one layer with fine line and space routing, with embedded trace routing.

Example 13 may include the apparatus of example 12, and/or other examples herein, wherein the fine line and space routing comprises a 10 um line width and 10 um space dimensions Example 14 may include the apparatus of example 3, and/or other examples herein, wherein the first side of the substrate is attached to the PCB via a ball grid array, the back side of the IC circuits adhesively coupled and an entire cross-section under-filled.

Example 15 may include the apparatus of example 14, and/or other examples herein, wherein the underfill is a high thermal conductivity underfill.

Example 16 may include the apparatus of example 1, and/or other examples herein, wherein solder balls of the BGA field are provided in at least one of through-mold interconnects, or plated copper pillars that are exposed and then subsequently attached with solder balls.

Example 17 may include the apparatus of example 3, and/or other examples herein, wherein one of the ICs is a TIA, and wherein the TIA is coupled, through the substrate, to a photodetector provided above the TIA on the upper surface of the package.

Example 18 may include the apparatus of example 17, and/or other examples herein, wherein an additional one of the ICs is an optical transmitter driver, coupled, through the substrate, to an optical transceiver provided above the TIA on the upper surface of the package.

Example 19 may include the apparatus of example 18, and/or other examples herein, wherein an additional one of the ICs is a clock and data recovery circuit (CDR), also coupled, through the substrate, to the optical transceiver provided above the TIA on the upper surface of the package.

Example 20 may include an interconnect structure for coupling an electrical IC to an optical IC, comprising:
a substrate with a first side and a second side opposite the first side, the substrate comprising:
a vertical interconnect structure, the interconnect structure comprising:
multiple metal layers, each metal layer comprising an anode portion at a center, and an extended cathode portion that surrounds the anode,
wherein between the anode portion and the extended cathode portion at each layer there is a void having a defined thickness; and
a defined number and arrangement of interlayer vias, to fine tune a high-frequency performance of the interconnect structure.

Example 21 may include the interconnect structure of example 20, and/or other examples herein, wherein the extended cathode portion includes two or more stitching vias.

Example 22 may include the interconnect structure of example 22, and/or other examples herein, wherein a greater number of stitching vias is provided in the extended cathode structure to decrease inductance and improve shielding of noise from other structures in the package.

Example 23 may include the interconnect structure of either of examples 20 or 21, and/or other examples herein, interconnect structure is further to shield any photocurrent travelling from a top of the interconnect structure through the coreless substrate to an electrical IC coupled to the second side of the substrate.

Example 24 may include the interconnect structure of example 23, and/or other examples herein, further comprising:
a photodetector coupled to the first side of the substrate; and
a TIA coupled to the second side of the substrate,
wherein the TIA is coupled, through the interconnect structure, to the photodetector.

Example 25 may include the interconnect structure of any one of examples 20-24, wherein the substrate is coreless.

Example 26 may include a method of manufacturing an integrated circuit (IC) package, comprising:
providing a substrate with a first side and a second side opposite the first side;
providing a ball grid array (BGA) field on the first side of the substrate;
disposing one or more electrical integrated circuits (ICs) on the first side of the substrate inside the BGA field to thermally interface with a printed circuit board (PCB) to which the package is to be coupled; and
disposing one or more optical ICs coupled to the second side of the substrate and communicatively coupled with the one or more electrical ICs disposed on the first side of the substrate via interconnects provided in the substrate.

Example 27 may include the method of example 26, and/or other examples herein, wherein the substrate is coreless, and further comprising covering at least one of the one or more optical ICs, at least partially, with an integrated heat spreader (IHS), to provide dissipation of heat produced by the at least one optical IC.

Example 28 may include the method of either one of examples 26 or 27, and/or other examples herein, wherein at least one of the electrical ICs is to communicate at frequencies between 10 and 200 Gigahertz (GHz) through the substrate to at least one of the optical ICs.

Example 29 may include the method of either one of examples 26 or 27, and/or other examples herein, wherein at least one of the ICs is to communicate at a rate greater than or equal to 56 Gigabytes per second (Gbps) through the substrate to at least one of the optical ICs.

Example 30 may include the method of example 27, and/or other examples herein, wherein covering includes partially covering an optical transmitter with the IHS and coupling to it via a mechanically compliant thermal interface material.

Example 31 may include the method of example 27, and/or other examples herein, wherein one of the electrical ICs is a TIA, and further comprising coupling the TIA, through the substrate, to a photodetector provided above the TIA on the upper surface of the coreless substrate.

Example 32 may include the method of example 31, and/or other examples herein, wherein an additional one of the electrical ICs is an optical transmitter driver, and further comprising coupling it, through the substrate, to an optical transmitter provided above the TIA on the upper surface of the substrate.

Example 33 may include the method of example 32, and/or other examples herein, wherein an additional one of the electrical ICs is a clock and data recovery (CDR) circuit, and further comprising coupling it, through the substrate, to the optical transmitter provided above the TIA on the upper surface of the substrate.

Example 34 may include the method of any one of examples 30-33, and/or other examples herein, wherein the package is fabricated according to standard Flip Chip-Chip Scale Packages (FC-CSP) substrate technology standards.

Example 35 may include the method of either of examples 26 or 27, and/or other examples herein, further comprising contacting the electrical ICs on the first side of the package to a copper plane connected to vias, slugs or coins in the PCB via a thermal interface material (TIM).

Example 36 may include the method of example 35, and/or other examples herein, wherein the TIM is at least one of: high K underfill, electrically conductive adhesive or sinterable solder.

Example 37 may include the method of example 35, and/or other examples herein, wherein the ICs on the first side of the package have back-side metallization, and the TIM is solder.

Example 38 may include the method of example 26, and/or other examples herein, wherein the coreless substrate comprises a prepreg substrate.

Example 39 may include the method of example 38, and/or other examples herein, wherein the prepreg substrate includes one layer with fine line and space routing, with embedded trace routing.

Example 40 may include the method of example 39, and/or other examples herein, wherein the fine line and space routing comprises a 10 um line width and 10 um space dimensions.

Example 41 may include the method of example 26, and/or other examples herein, further comprising attaching the first side of the substrate to the PCB via a ball grid array, coupling the back side of the electrical IC circuits adhesively, and under-filling an entire cross-section.

Example 42 may include the method of example 41, and/or other examples herein, wherein the under-filling uses a high thermal conductivity underfill.

Example 43 may include the method of example 26, and/or other examples herein, wherein providing the BGA field includes providing solder balls of the BGA field either using through-mold interconnects, or by exposing plated copper pillars and subsequently attaching solder balls to them.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed:
1. An optoelectronic apparatus comprising:
a package including a substrate with a first side and a second side opposite the first side, wherein the first side comprises a ball grid array (BGA) field;
one or more integrated circuits (ICs) disposed on the first side of the substrate within the BGA field that thermally interface with a printed circuit board (PCB), to which the package is to be coupled; and
one or more optical ICs coupled to the second side and communicatively coupled with the one or more ICs via interconnects provided in the substrate, wherein at least one of the optical ICs is at least partially covered by an integrated heat spreader (IHS), to provide dissipation of heat produced by the at least one optical IC.

2. The apparatus of claim 1, wherein the ICs include one or more of a transceiver or transmitter driver, a transimpedance amplifier (TIA) or a clock and data recovery (CDR) circuit.

3. The apparatus of claim 1, wherein the one or more optical ICs include an optical transmitter or an optical receiver.

4. The apparatus of claim 3, wherein at least one of the ICs is to communicate at frequencies between 10 and 200 Gigahertz (GHz) through the substrate to an optical transmitter provided on an upper surface of the substrate.

5. The apparatus of claim 3, wherein the IHS partially covers the optical transmitter and is coupled to it via a mechanically compliant thermal interface material.

6. The apparatus of claim 3, wherein one of the ICs is a TIA, and wherein the TIA is coupled, through the substrate, to a photodetector provided above the TIA on an upper surface of the package.

7. The apparatus of claim 6, wherein an additional one of the ICs is an optical transmitter driver, coupled, through the substrate, to an optical transceiver provided above the TIA on the upper surface of the package.

8. The apparatus of claim 7, wherein an additional one of the ICs is a clock and data recovery circuit (CDR), also coupled, through the substrate, to the optical transceiver provided above the TIA on the upper surface of the package.

9. The apparatus of claim 1, wherein the ICs on the first side of the package are to contact a copper plane connected to vias, slugs or coins in the PCB via a thermal interface material (TIM).

10. The apparatus of claim 9, wherein the TIM is at least one of: high K underfill, electrically conductive adhesive or sinterable solder.

11. The apparatus of claim 9, wherein the ICs on the first side of the package have back-side metallization, and the TIM is solder.

12. The apparatus of claim 1, wherein the substrate is coreless, and comprises a prepreg substrate, and wherein the first side of the substrate is attached to the PCB via a ball grid array, the back side of the IC circuits adhesively coupled and an entire cross-section under-filled.

13. The apparatus of claim 12, wherein the underfill is a high thermal conductivity underfill.

14. The apparatus of claim 1, wherein solder balls of the BGA field are provided in at least one of through-mold interconnects, or plated copper pillars that are exposed and then subsequently attached with solder balls.

15. An interconnect structure for coupling an electrical IC to an optical IC, comprising:
   a substrate with a first side and a second side opposite the first side, the substrate comprising:
   a vertical interconnect structure, the interconnect structure comprising:
      multiple metal layers, each metal layer comprising an anode portion at a center, and an extended cathode portion that surrounds the anode,
      wherein between the anode portion and the extended cathode portion at each layer there is a void having a defined thickness; and
      a defined number and arrangement of interlayer vias, to fine tune a high-frequency performance of the interconnect structure.

16. The interconnect structure of claim 15, wherein the extended cathode portion includes two or more stitching vias.

17. The interconnect structure claim 16, wherein a greater number of stitching vias is provided in the extended cathode portion to decrease inductance and improve shielding of noise from other structures in the package.

18. The interconnect structure of claim 16, wherein the substrate is coreless, and wherein the interconnect structure is further to shield any photocurrent travelling from a top of the interconnect structure through the substrate to an electrical IC coupled to the second side of the substrate.

19. The interconnect structure of claim 18, further comprising:
   a photodetector coupled to the first side of the substrate; and
   a TIA coupled to the second side of the substrate,
   wherein the TIA is coupled, through the interconnect structure, to the photodetector.

20. A method of manufacturing an integrated circuit (IC) package, comprising:
   providing a substrate with a first side and a second side opposite the first side;
   providing a ball grid array (BGA) field on the first side of the substrate;
   disposing one or more electrical integrated circuits (ICs) on the first side of the substrate inside the BGA field to thermally interface with a printed circuit board (PCB) to which the package is to be coupled; and
   disposing one or more optical ICs coupled to the second side of the substrate and communicatively coupled with the one or more electrical ICs disposed on the first side of the substrate via interconnects provided in the substrate.

21. The method of claim 20, wherein the substrate is coreless, and further comprising covering at least one of the one or more optical ICs, at least partially, with an integrated heat spreader (IHS), to provide dissipation of heat produced by the at least one optical IC.

22. The method of claim 21, wherein at least one of the ICs is to communicate at a rate greater than or equal to 56 Gigabytes per second (Gbps) through the substrate to at least one of the optical ICs.

23. The method of claim 22, wherein one of the electrical ICs is a TIA, and further comprising coupling the TIA, through the substrate, to a photodetector provided above the TIA on an upper surface of the substrate.

24. The method of claim 23, wherein an additional one of the electrical ICs is an optical transmitter driver, and further comprising coupling it, through the substrate, to an optical transmitter provided above the TIA on the upper surface of the substrate.

25. The method of claim 21, wherein covering includes partially covering an optical transmitter with the IHS and coupling to it via a mechanically compliant thermal interface material.

* * * * *